US009009113B1

(12) United States Patent
Shapira

(10) Patent No.: US 9,009,113 B1
(45) Date of Patent: Apr. 14, 2015

(54) SYSTEM AND METHOD FOR GENERATING ARTIST-SPECIFIED DYNAMIC ALBUMS

(71) Applicant: Escapemusic Limited, Kowloon (HK)

(72) Inventor: Sephi Joseph Shapira, Ramot Hasavim (IL)

(73) Assignee: Escapemusic Limited, Kowloon (HK)

( * ) Notice: Subject to any disclaimer, the term of this patent is extended or adjusted under 35 U.S.C. 154(b) by 0 days.

(21) Appl. No.: 14/519,168

(22) Filed: Oct. 21, 2014

(51) Int. Cl.
*G06F 17/30* (2006.01)

(52) U.S. Cl.
CPC ................... *G06F 17/30749* (2013.01)

(58) Field of Classification Search
None
See application file for complete search history.

(56) References Cited

U.S. PATENT DOCUMENTS

| | | | |
|---|---|---|---|
| 8,515,979 B2 | 8/2013 | Mehta | 707/758 |
| 8,560,950 B2 | 10/2013 | Bull et al. | 715/716 |
| 8,694,813 B2 | 4/2014 | Shayer | 713/323 |
| 2007/0174866 A1 | 7/2007 | Brown et al. | 725/28 |
| 2009/0204490 A1 | 8/2009 | Squillace et al. | 705/14 |
| 2009/0210808 A1 | 8/2009 | West | 715/764 |
| 2010/0299212 A1 | 11/2010 | Graylin et al. | 705/14.66 |
| 2011/0196726 A1 | 8/2011 | Poellnitz | 705/14.16 |
| 2012/0042263 A1 | 2/2012 | Rapaport et al. | 715/753 |
| 2012/0254250 A1 | 10/2012 | Gentile et al. | 707/793 |
| 2013/0030987 A1 | 1/2013 | Zuckerberg et al. | 705/39 |
| 2013/0031478 A1 | 1/2013 | Strober | 715/716 |
| 2013/0160145 A1 | 6/2013 | Henzie et al. | 726/29 |
| 2013/0254113 A1 | 9/2013 | Singh et al. | 705/59 |
| 2013/0325621 A1 | 12/2013 | Sanginiti et al. | 705/14.64 |
| 2014/0031086 A1 | 1/2014 | Yoo | 455/566 |
| 2014/0059059 A1 | 2/2014 | Barman et al. | 707/752 |
| 2014/0075394 A1 | 3/2014 | Nawle et al. | 715/863 |
| 2014/0137204 A1 | 5/2014 | Vitzthum et al. | 726/4 |

FOREIGN PATENT DOCUMENTS

WO     WO 02/45316     6/2002

*Primary Examiner* — Bai D. Vu
(74) *Attorney, Agent, or Firm* — Pillsbury Winthrop Shaw Pittman LLP

(57) ABSTRACT

A system and method is provided that facilitate artist-specified dynamic albums that include music that may be changed with or without intervention by a user at a user device at which a dynamic album has been stored, according to an implementation of the invention. A dynamic album may include a set of songs provided through an artist specific application installed at a user device. The system may modify the dynamic album based on one or more album parameters that specify a change to be made to the set of songs. For example, the one or more album parameters specify the removal of one or more songs from the dynamic album, the addition of one or more new songs, the replacement of one or more songs, a rearrangement of (e.g., shuffling) the order of one or more songs, and/or other change to the set of songs.

30 Claims, 22 Drawing Sheets

SYSTEM AND METHOD FOR GENERATING ARTIST-SPECIFIED DYNAMIC ALBUMS

RELATED APPLICATIONS

This application is related to U.S. patent application Ser. No. 14/519,125, entitled "System and Method of Creating and Managing Entity-specific Applications in an Integrated Platform", filed on Oct. 20, 2014; U.S. patent application Ser. No. 14/519,129, entitled "System and Method for providing individual client applications for artist-specific content", filed on Oct. 21, 2014; U.S. patent application Ser. No. 14/519,132, entitled "System and Method for facilitating co-play and download of artist specific client applications via user-provided playlists", filed on Oct. 21, 2014; and U.S. patent application Ser. No. 14/519,171, entitled "System and Method for facilitating cross-application functionality among artist specific client applications", filed on Oct. 21, 2014, all of which are incorporated by reference herein in their entireties.

FIELD OF THE INVENTION

The invention relates to systems and methods of generating artist-specified dynamic albums that include music that may be changed with or without intervention by a user at a user device at which a dynamic album has been stored.

BACKGROUND OF THE INVENTION

The music industry has been evolving as technology provides greater access to music created by artists (e.g., musicians, singers, bands, etc.). For example, music downloads and streaming services have created different models of providing music and other content. However, while providing easier access to music, these different provisioning models have had adverse effects on artists and fans (e.g., users) alike and also fail to integrate music with other content created by the artist.

For example, individual artists have been experiencing diminishing returns on the songs and albums they create. Various factors such as illegal music download and a la carte purchase of individual songs have contributed to this decline. For users, they must continue to purchase music downloads (or illegally obtain music) or subscribe to streaming services, which requires use of network bandwidth. Such network bandwidth places a burden on streaming services and also requires fans to use oftentimes expensive network services (whose availability may be erratic) and increased battery usage when streamed to mobile devices.

Furthermore, artists have been increasingly using social media (e.g., FACEBOOK, TWITTER, INSTAGRAM, etc.) and other content services to provide artist content to users. However, conventional music provisioning services typically ignore this content, requiring users to separately access music services and social media and other content services. Thus, even though fandom is ubiquitous in the music industry, conventional music delivery services typically ignore this information. What's more, each social media platform typically monetizes an artist's social media account by collecting advertising and other fees related to user interaction with the social media account, while providing little to no compensation to the artist in return.

Additionally, there is conventionally little to no connection between actual use (e.g., playback) of songs to income. For instance, in a content streaming model, payment is typically inversely related to usage because payment to artists is typically fixed regardless the number of times an artist's song is streamed, resulting in decreased revenue per stream as the number of streams increases. In a download model, after the initial payment for download, a given song may be played without further monetization opportunities.

Still further, once downloaded or streamed, artists typically lack control over music consumed by the user. Such lack of control prevents the artist from easily providing a new song, deleting an existing song, and/or otherwise exercising control over the music provided to their users.

Another problem of streaming services is that each individual artist whose music is streamed has little to no motivation to promote the streaming service (because they have little to no financial incentive to do so). These and other drawbacks of conventional content delivery (in particular music delivery) services exist.

SUMMARY OF THE INVENTION

The invention addressing these and other drawbacks relates to systems and methods of generating artist-specified dynamic albums that include music that may be changed with or without intervention by a user at a user device at which a dynamic album has been stored, according to an implementation of the invention.

A dynamic album may include a set of songs provided through an artist specific application installed at a user device. An artist specific application may be created and branded for an artist that provides artist content such as music to users through the artist specific application. The artist specific application may facilitate monetizing and maintaining control over the artist content, such as music in the form of a dynamic album.

A dynamic album may be stored at a user device. Nevertheless, the system may modify the set of songs without intervention by the user of user device. Thus, while a user may be able to listen to a dynamic album at the user device even without a network connection, the system may maintain control over the dynamic album. In some implementations, the dynamic album may be subject to one or more music leases that, upon expiration, renders the dynamic album or portions thereof to be unplayable.

The system may modify the dynamic album based on one or more album parameters that specify a change to be made to the set of songs. For example, the one or more album parameters specify the removal of one or more songs from the dynamic album, the addition of one or more new songs, the replacement of one or more songs, a rearrangement of (e.g., shuffling) the order of one or more songs, and/or other change to the set of songs.

The album parameters may be specified by an artist. In this manner, an artist may use the features and functions of a dynamic album to send music and/or other updates to the dynamic album. For example, the artist may introduce new songs, delete old songs, replace one version of a song with another version of the song, present snippets of songs in production, re-arrange an order in which the songs of a dynamic album are played, specify a first song to be played, and/or otherwise change the dynamic album. As another example, the artist may send an audio and/or a video message (e.g., commentary, uncut versions of the song, outtakes, etc.) to be played in association with the dynamic album.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
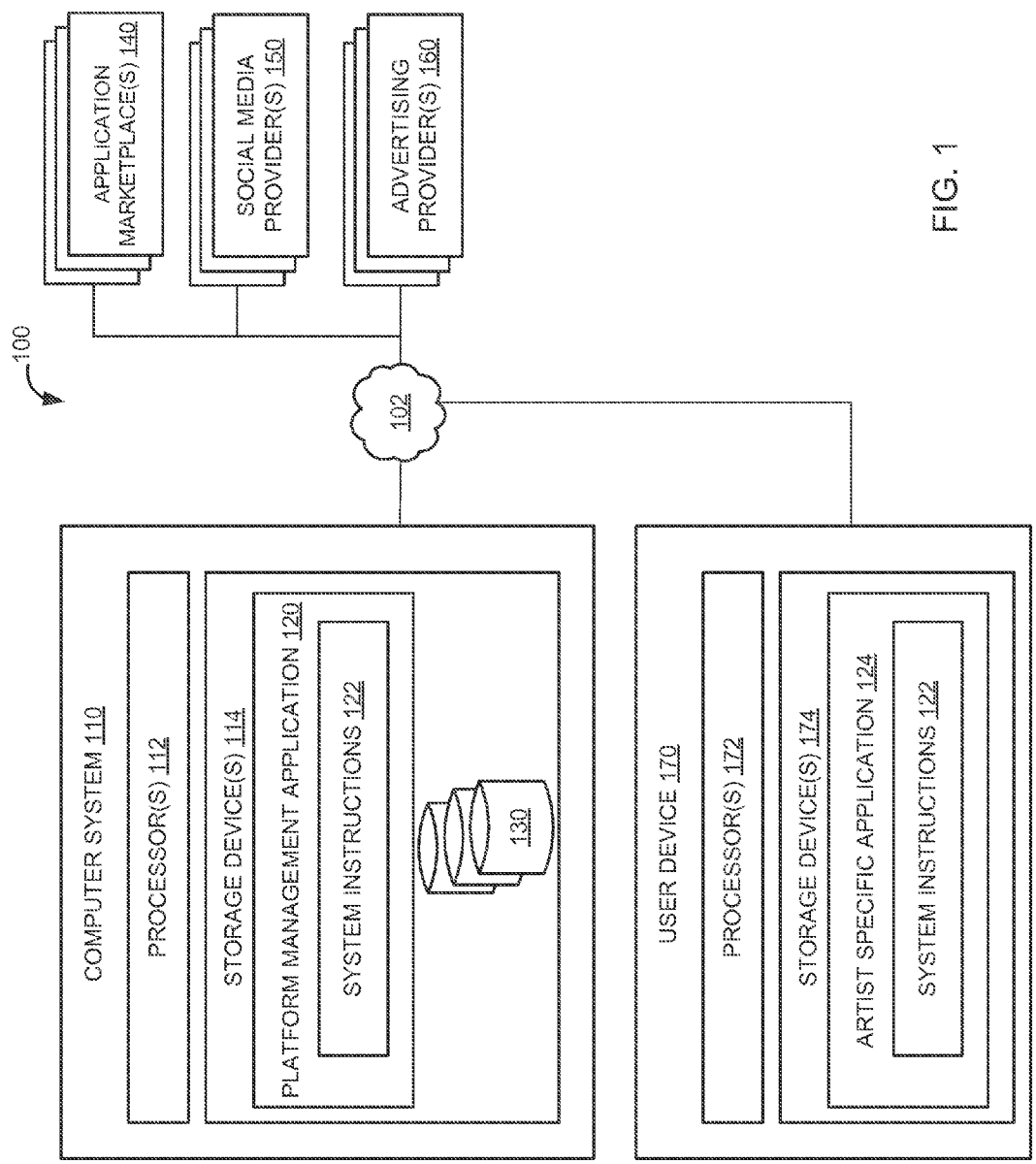
FIG. 1 illustrates a system for creating and managing entity-specific applications that each relates to an individual entity, integrates the entity's content, and connects fans with the individual entity through multimedia experiences provided through the entity-specific application, according to an implementation of the invention.

FIG. 1 illustrates a system 100 for creating and managing entity-specific applications that each relates to an individual entity, integrates the entity's content, and connects fans with the individual entity through multimedia experiences provided through the entity-specific application, according to an implementation of the invention. An entity may include an individual performer (e.g., a singer), a group of performers (e.g., a band), a comedian, a celebrity, an item, and/or other subject to which an application relates.

System 100 may create and manage various types of entity-specific applications that integrate different types of content. For example, a movie-specific application that may be specific to a particular movie or a product-specific application that may be specific to a particular product may be created. For convenience, artist specific applications that provide music and other content related to an artist such as a musician/singer will be described herein. Furthermore, as used herein, the terms "song" and "music" may be used interchangeably and may refer to a musical performance that may be replayed, whether or not such musical performance includes lyrics sung by the artist.

Using the system, a given artist may create an artist specific application (hereinafter also referred to as "ASA") that includes music and other content related to the artist. Users may download the ASA (as well as other ASAs of other artists) or otherwise obtain and execute the ASA at a user device in order to listen to the artist's music and consume other content related to the artist through the ASA. Thus, instead of a single application that streams music from multiple artists, each ASA may relate to an individual artist.

In some implementations, a given artist may create other subject specific applications, such as a first album specific application that relates to one of the artist's album and a second album specific application that relates to another one of the artist's albums. The artist may create other subject specific applications as well.

System Overview

System 100 may facilitate a new paradigm of content management, provision, and ownership of multimedia content. Specifically, system 100 may provide an "in-stream" content management and provisioning platform in which music and/or other content is downloaded to and streamed from ASAa user device executing an application provided by the in-stream content management and provisioning platform. For example, the content such as music may be downloaded to a user device but not be separately available, other than through a corresponding ASA. Of course, the artist may continue to make the music available through conventional distribution channels (e.g., via download) separate from the in-stream content management and provisioning platform as well.

In an implementation, the music may be integrated with (e.g., compiled or otherwise encoded into) the ASA such that when the ASA is downloaded to the user device, a binary or other instructions that encode the music is downloaded to the user device as part of the ASA but is not separately available to be played other than through the ASA. In this implementation, the music may not be downloaded to the user device as a separate file, but is instead integrated within an ASA executable file so that the user does not have access to the given song file separate from the ASA. In another implementation, a given song may be encrypted or otherwise provided as a separate binary that only the ASA may play.

Because the music may not be accessed or played other than through a corresponding ASA, the system may exercise control over the music, via the ASA, even though information encoding the music is downloaded to and stored at the user device. For example, the system may remove or otherwise render unplayable a song from the user device. In the foregoing example, the user may not be provided with ownership rights over the music, yet possesses a copy of the music (e.g., information that encodes the music) at the user device such that that music may be played from local storage without a network connection.

In some implementations, the music may be provided to the user as an in-stream allotment (also referred to hereinafter interchangeably as a music lease) that must be renewed before expiration. If the system has not received and approved a request to renew the music lease from a given ASA installed at a user device, the system may cause the music to be removed or otherwise rendered unplayable. For example, an ASA may be programmed to periodically request a new lease from computer system 110. If the new lease is not granted or the ASA cannot communicate with the computer system 110 before the music lease has expired, the ASA may not play some or all of the music associated with the ASA (e.g., the ASA may delete or otherwise render the music unplayable). In some instances, a music lease may relate to all music stored with an ASA such that all music stored with the ASA will have the same expiration time. In other instances, a music lease may relate to only a subset of the music stored with an ASA such that different music will have different expiration times.

Using the system, music may be provided to the user through an ASA based on a freemium model, giving the user an ability to store and play music locally without a network connection (while the music lease remains valid) and yet without expressly paying for a music download.

System 100 may also facilitate the monetization by the artist of artists' content. For example, by monitoring usage and other activity related to the ASA, the system may provide an individual artist with a revenue share model that shares income derived from the use of the ASA between the artist and an entity that operates the system. The income may be based on advertising-related income (e.g., resulting from ads placed on the ASA), purchases made through an ASA or the ecosystem, and/or other income sources related to use of the ASA for an artist. Such income may be shared between the operators of the system and an artist Each ASA may communicate with other ASAs also installed at user device 170, computer system 110, other user devices 170 that include at least one ASA installed thereon, and/or other devices. In this manner, system 100 may facilitate cross-application functionality across the same or different ASA installed at multiple devices.

To facilitate a cross-application ecosystem, the system may obtain, store, or otherwise access content such as music, social media posts, rewards, and/or other information from different ASAs. In this manner, such content may be searched for and provided to individual ASAs that may otherwise be unrelated to other ASAs. In this manner, the system may facilitate a unified ecosystem of different ASAs. Furthermore, the system may categorize different ASAs into different groups based on musical genres, fan base (e.g., fan demographics), interests, and/or other categorizations, thereby enabling searches for (and discovery of) new and additional artists.

The system may also support cross-application analytics. For example, the system may obtain usage and analytics information across different ASAs in order to assess popularity or trends. This may provide artists, studios, an operator of the system, and/or other entities with insight into user interests across a broad spectrum of ASAs.

In an implementation, the system may facilitate the creation and use of cross-application playlists. The system may allow the creation of a playlist that includes a plurality of songs from different ASAs to be played in a particular order (including a preset or random order). Because a given song may only be played/access from a corresponding ASA, a playlist that includes songs from different ASAs may cause ASAs to be opened or otherwise activated when a song included therein is next in line to be played.

ASAs that have already played a song in the playlist may be closed to minimize a memory footprint (or each ASA may remain open but be placed in a de-activated or unfocused state). Alternatively or additionally, the system may cause such opening and closing of ASAs in order to facilitate appropriate monetization by each artist in cases where opening or activating a given ASA 124 contributes to a potential payment to be made to the artist.

A playlist may be used to play songs locally at user device 170, share the songs with other users (which may encourage the other users to download ASAs 124 included in the playlist that are not already installed at the other users' device), and/or for other purposes.

In an implementation, the system may create and maintain one or more dynamic albums. A dynamic album may include a set of songs provided through an ASA installed at user device 170. The dynamic album may be stored at the user device 170 (e.g., in the manner as described herein with respect to music). Nevertheless, the system may modify the set of songs without intervention by the user of user device 170. Thus, while a user may be able to listen to a dynamic album at the user device 170 even without a network connection, the system may maintain control over the dynamic album. In some implementations, the dynamic album may be subject to one or more music leases as described herein.

The system may modify the dynamic album based on one or more album parameters that specify a change to be made to the set of songs. For example, the one or more album parameters specify the removal of one or more songs from the dynamic album, the addition of one or more new songs, the replacement of one or more songs, a rearrangement of (e.g., shuffling) the order of one or more songs, and/or other change to the set of songs.

The album parameters may be specified by an artist. In this manner, an artist may use the features and functions of a dynamic album to send music and/or other updates to the dynamic album. For example, the artist may introduce new songs, delete old songs, replace one version of a song with another version of the song, present snippets of songs in production, re-arrange an order in which the songs of a dynamic album are played, specify a first song to be played, and/or otherwise change the dynamic album. As another example, the artist may send an audio and/or a video message (e.g., commentary, uncut versions of the song, outtakes, etc.) to be played in association with the dynamic album.

System Components

Other uses of system 100 are described herein and still others will be apparent to those having skill in the art. Having described a high level overview of some of the system functions, attention will now be turned to various system components that facilitate these and other functions.

System 100 may include a computer system 110, one or more databases 130, an application marketplace 140, one or more social media providers 150, one or more advertising providers 160, one or more user devices 170, and/or other components.

Computer System 110

Computer system 110 may generate and customize an ASA based on input from an artist, renew music leases, provide and communicate updates and new content to ASAs installed at user devices, facilitate communication between system users (e.g., artists, fans, etc.), obtain usage metrics from ASAs installed at user devices, and manage an ecosystem of ASAs for different artists. By communicating with ASAs installed at user devices, the system may exercise control over the music and other content available at the ASAs.

To facilitate these and other functions, computer system 110 may include one or more processors 112, one or more storage devices 114, and/or other components. Processor(s) 112 may be programmed by one or more computer program instructions, which may be stored in storage device(s) 114. The one or more computer program instructions may include, without limitation, a platform management application 120 and/or other instructions that program computer system 110. As used herein, for convenience, the various instructions will be described as performing an operation, when, in fact, the various instructions program the processors 112 (and therefore computer system 110) to perform the operation.

Figure 2:
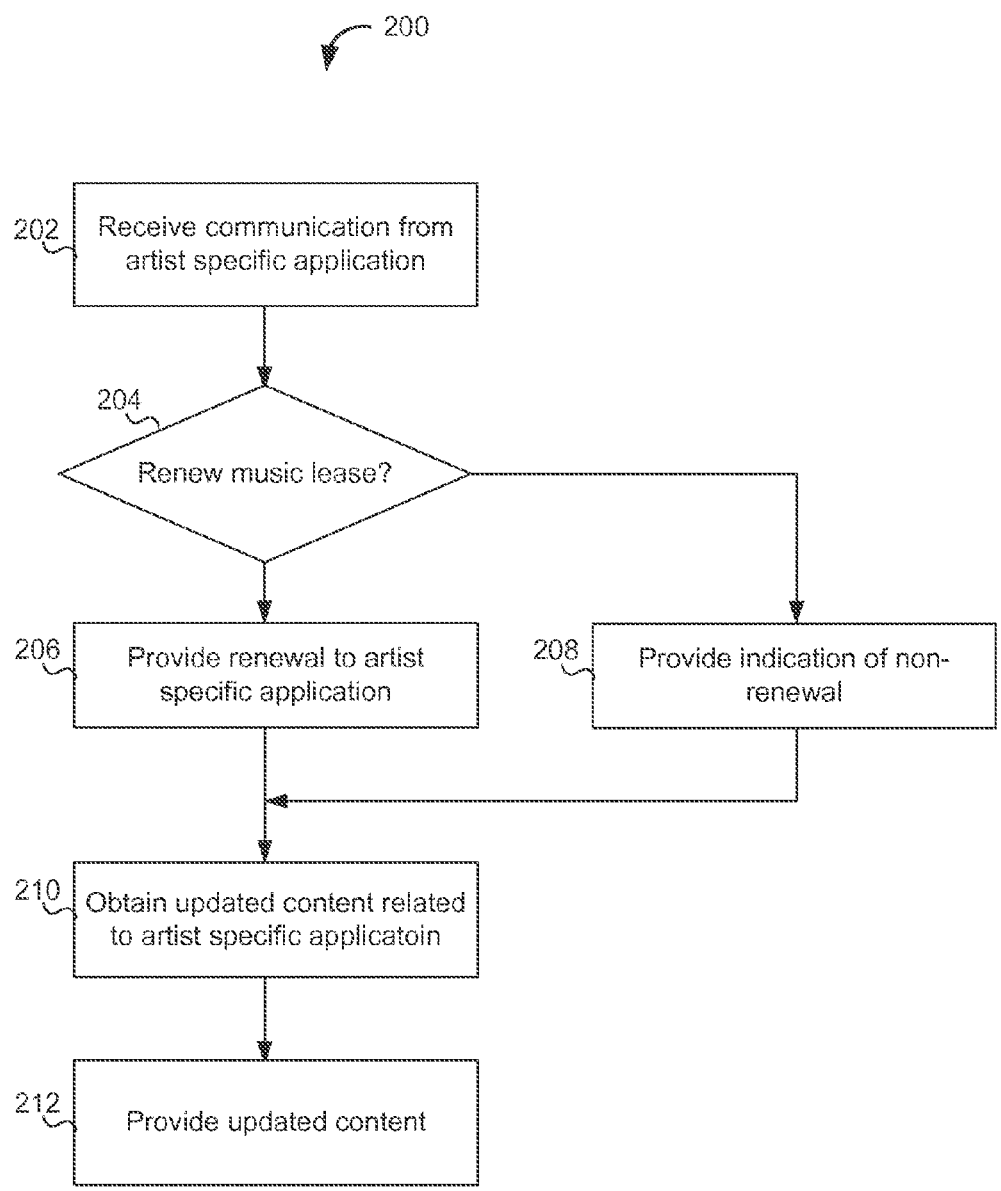
FIG. 2 illustrates a flow diagram depicting a process of providing a music lease and content to an artist specific application, according to an implementation of the invention.

FIG. 2 illustrates a flow diagram depicting a process 200 for providing a music lease and content to an ASA, according to an implementation of the invention. The various processing operations and/or data flows depicted in FIG. 2 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 202, a communication may be received from an ASA 124 executing on a user device 170. The communication may include an identity of ASA 124 (e.g., an application identifier), an identity of user device 170, and/or other identification information.

In an operation 204, a determination of whether to provide a music lease renewal may be made. The determination may be based on whether the artist wishes to continue to allow certain music to be played, whether the particular ASA 124 executing on a user device 170 should be allowed to have a renewed music lease (e.g., older versions of an ASA may not be allowed to have a renewed music lease to encourage an update to a newer version), and/or other reason.

If a music lease is to be renewed, in an operation 206, the music lease renewal may be provided to ASA 124. The music lease renewal may include an indication of a length of time that the lease is renewed, an expiration time, a number of times music governed by the music lease is allowed to be played, a simple indication to renew the lease, and/or other indication that the music lease is renewed. In some implementations, the music lease renewal may include a code that when decoded at ASA 124 causes the lease renewal.

If a music lease is not to be renewed, in an operation 208, an indication may be provided to ASA 124 that the music lease is not to be renewed. In some instances, a reason for the refusal may be provided so that ASA 124 may remedy any issues (e.g., by causing or suggesting that a newer version of the ASA 124 be downloaded/installed).

In an operation 210, updated content may be obtained. For instance, content such as artist-provided content (e.g., messages, multimedia such as songs, endorsements, etc.), rewards, social media content, and/or other content related to the artist may be obtained. In some implementations, at least some of the foregoing content gathering may occur via a process executing at ASA 124.

In an operation 212, the updated content may be provided to ASA 124, which may integrate and display the content through one or more of its interfaces.

Generating ASAs

Having described an overview of interactions between computer system 110 and an ASA 124 executing at a user device 170, generation of an ASA 124 based on artist input will now be described.

In an implementation, platform management application 120 may generate an ASA based on one or more application parameters, which may be provided by an artist, a human developer working on behalf of an entity that operates system 100, and/or other entity. To receive the application parameters from an artist, platform management application 120 may expose an interface, such as a website, used by the artist to provide the application parameters.

The application parameters may specify the content, functionality, appearance, and/or other characteristic of an ASA. For example, the application parameters may specify/include one or more "skins" (e.g., templates) used to specify an overall appearance, one or more songs to be included in the ASA, one or more social media accounts from which to aggregate content, one or more rewards or loyalty specifications, and/or other parameters that may be used to specify and customize an ASA.

Platform management application 120 may obtain and use a template that specifies an appearance (e.g., "look and feel") for an ASA. A given artist may select from among several appearances for the application and may specify that a particular template be used. Alternatively or additionally, each skin may specify content that should be included in the application. For instance, one skin may specify that social media content should be made available while another skin may specify that social media content should be excluded. Other appearance and/or content customizations may be made included in a template as well.

Platform management application 120 may obtain each song to be included in an ASA. For example, each song may be obtained from the artist, an entity acting on behalf of the artist (e.g., a studio, record label, etc.), and/or other entity. Platform management application 120 may compile each song into the ASA being generated or otherwise make each song not playable except through the ASA.

In an implementation, platform management application 120 may encrypt a song file for a given song using, without limitation, the Advanced Encryption Standard ("AES"). Platform management application 120 may then encode the encrypted song file into an ASA 124. For example, PMA 120 may use compilation procedures specified by operating system vendors (e.g., iOS, Android, Windows, etc.). Upon compilation, PMA 120 may obfuscate or otherwise secure code using obfuscation and/or other techniques (e.g., using Pro-Guard, DexGaurd, etc.).

Platform management application 120 may obtain a listing of social media accounts from which to aggregate social media content posted by the artist to provide such content through the ASA being generated. In this manner, the artist may specify social media accounts from which to aggregate social media content.

Platform management application 120 may obtain a loyalty specification that describes a loyalty program made available through the ASA. Generally speaking, the loyalty program may provide one or more types of loyalty items to users to incentivize continued use of the ASA. Such continued use, in turn, enhances revenue opportunities for the system and the artist through advertisements and other monetization strategies that are based on the use of the ASA.

The loyalty specification may be customized by the artist, and may include one or more loyalty parameters that specify how a user may acquire or spend loyalty awards. For example, the loyalty parameters may specify whether and how much real currency may be used to purchase a given loyalty award, conditions that must be satisfied by a user in order to accrue a given loyalty award, and/or other specifications related to loyalty awards. In this manner, an artist may customize the types of loyalty awards offered as well as how a user may accrue and/or spend such awards.

In some implementations, the system may require that a certain number of types of loyalty awards be made available by the artist before an ASA is allowed to be release for download by users. In this manner, the system may ensure that a sufficient number of different types of loyalty awards are to be made available to users to provide the users with a variety of available awards, keeping the users engaged with the ASA.

In an implementation, platform management application 120 may index and store content and customizations included in or associated with an ASA in a content database, such as a database 130. Each content item (e.g., song, message, loyalty program item, etc.) may be assigned with a unique identifier and stored in the content database. Such an index and storage may facilitate rapid identification of the content associated with a given ASA and cross-application functions such as cross-application search functions described herein.

In addition to customizations that a given artist may make to his or her ASA, each ASA may include a core set of system functions that facilitate the various features and functions described herein. The core set of system functions is described further below with respect to the system instructions.

User Device 170

Once a given ASA is generated, the system may make the application available for download through an application marketplace 140 and/or other channel. For instance, user device 170 may download or otherwise store and install one or more ASAs each corresponding to an individual artist. A user who wishes to listen to the music of multiple artists (and/or obtain content related to such artists) may download each artist's ASA to a user device 170, which may execute multiple ASAs.

To facilitate these and other functions, user device 170 may include one or more processors 172, one or more storage devices 174, and/or other components. Processor(s) 172 may be programmed by one or more computer program instructions, which may be stored in storage device(s) 174. The one or more computer program instructions may include an ASA 124 and/or other instructions. In addition to one of more of system instructions 122 described below, ASA 124 may provide one or more user interfaces that collectively provide interfaces through which artist content is presented. The one or more user interfaces may include, for instance, a media player that plays music, videos, etc., a social media browser that displays social media content aggregated from various social media platforms (which may be integrated into a single display or separately navigable displays that each is displays social media content from a corresponding social media provider), a loyalty display that displays loyalty items, a fan board display, a network—e.g., Internet—browser that can monitor and display previous visit histories, and/or other displays to provide artist content described herein.

Figure 3:
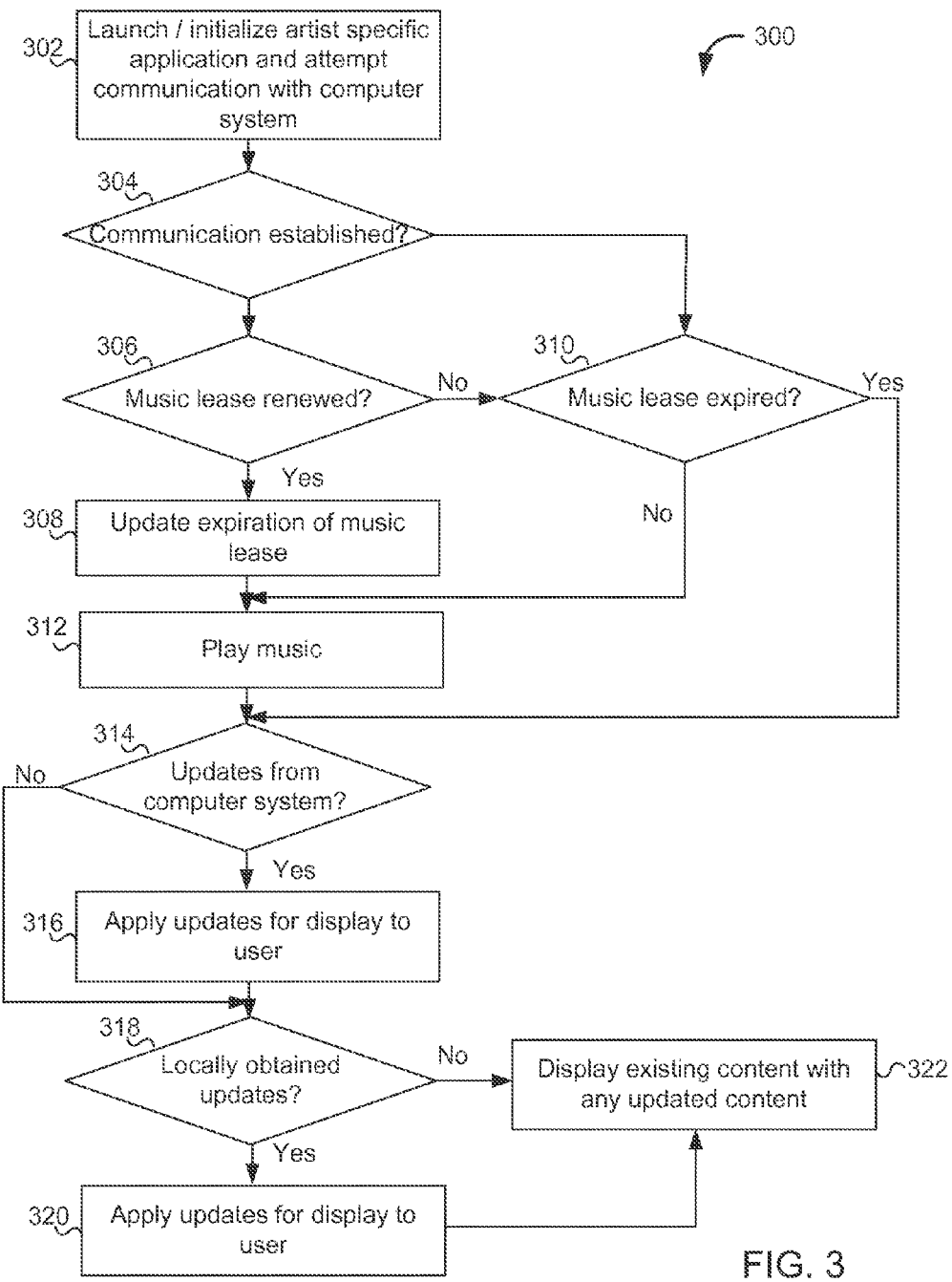
FIG. 3 illustrates a flow diagram depicting a process for receiving a music lease and content at an artist specific application executing at a user device, according to an implementation of the invention.

FIG. 3 illustrates a flow diagram depicting a process 300 for receiving a music lease and content at ASA 124 executing at user device 170, according to an implementation of the invention.

In an operation 302, ASA 124 may be launched or otherwise be activated (e.g., brought into a foreground/active state from a background/inactive state). In some implementations, upon being launched or otherwise activated, ASA 124 may attempt to communicate with computer system 110. Alternatively or additionally, ASA 124 may attempt such communication at other times.

In an operation 304, ASA 124 may determine whether a communication was established and/or whether a network connection is available. If the communication is established, in an operation 306, ASA 124 may determine whether a music lease renewal has been received from computer system 110. If the music lease renewal was received, in an operation 308, ASA 124 may update the music lease based on the music lease renewal. In an operation 312, ASA 124 may begin playing the music associated with the music lease.

Returning to operation 304, if a communication has not been established, in an operation 310, ASA 124 may determine whether the music lease has expired. If the music lease has not expired, in an operation 312, ASA 124 may begin playing the music associated with the music lease. If the music lease has expired, ASA 124 may skip operation 312, and proceed to operation 314. In some implementations (not illustrated in FIG. 3), if the music lease has expired, ASA 124 may render itself inoperable such as by shutting down or causing itself to be uninstalled from user device 170.

Returning to operation 306, if the music lease has not been renewed, ASA 124 may proceed to operation 310 and processing may proceed as previously described with respect to operation 310.

In an operation 314, ASA 124 may determine whether any updates have been received from computer system 110. If updates have been received from computer system 110, ASA 124 may apply the updates for display to the user in an operation 316. If no updates have been received from computer system 110, ASA 124 may skip operation 316.

In some implementations, an update from computer system 110 may include a new song to be added (e.g., through a dynamic album as described herein). In these implementations, ASA 124 the song may be encoded as information to be incorporated into the code or binary of the ASA 124 to render the song unusable other than through ASA 124. In other implementations, ASA 124 may decrypt or otherwise decode the song in a manner that the song is unusable other than through ASA 124. In some implementations, the new song to be added may be encrypted by PMA 120 and downloaded to user device 170, where ASA 124 decrypts and provides the song. In some implementations, PMA 120 may generate an updated version of AMA 124 that includes the new song (or other dynamic album changes) for updating a current version of AMA 124 installed at a user device 170. In this implementation, the PMA 120 may cause the updated AMA 124 to be incorporated with or otherwise replace the current version of AMA 124 using an application installer associated with user device 170.

In an operation 318, ASA 124 may determine whether any locally-obtained updates are available (e.g., in instances where ASA 124 aggregates social media content related to the artist, or otherwise obtains other content related to the artist or other users). If such updates are available, ASA 124 may apply the updates for display to the user in an operation 320.

In an operation 322, ASA 124 may display content related to the artist, including any applied updates. Such content may be displayed using one or more interfaces, such as those illustrated with respect to one or more screenshots described herein.

In an implementation, a user may be granted some level of control over the content such as music provided through an ASA 124. For example, the user may select songs that are displayed in a listing of songs (or may cause an ASA 124 to remove one or more songs to save disk space). In some implementations, the user may be permitted to exercise such control under certain conditions. For example, the user may be permitted to modify content only if that content has not been interacted with for a certain period of time. In a particular example, a user may be permitted to delete a song only if that song has not been played within the last month.

System Databases

In an implementation, computer system 110, user device 170, and/or other system components may access one or more database(s) 130, which may include an application template database, an artist database, a user database, a reward database, a content database, and/or other databases.

Application Marketplace 140

Application marketplace 140 may include application markets that make available for download ASAs. For example, application marketplace 140 may include, without limitation, the GOOGLE PLAY store, APPLE APP store, WINDOWS PHONE store, BLACKBERRY WORLD, and/or other application markets. System 100 may make ASAs available for download from an application marketplace 140. As such, users may download ASAs from application marketplace 140. Alternatively or additionally, system 100 may make ASAs available for download from other sources, such as directly from computer system 110.

Social Media Providers 150

Social media providers 150 may include, for example, social media platforms (e.g., FACEBOOK, TWITTER, INSTAGRAM, FLICKR, YOUTUBE, etc.), and/or other providers that generally distribute content uploaded by users to be consumed by other users. The content may be generated by content sources such as individuals, corporations, and/or other entities that may create content. Artists and users may post social media content to one or more social media providers 150, from which system 100 may aggregate and present through ASAs as described herein.

Advertisement Providers 160

Advertisement provider(s) 160 may include entities that wish to promote an item such as a good or service. The system may obtain advertisements to from advertisement provider(s) 160 in order to leverage the ASA ecosystem to provide the advertisements. Advertisements may include promotional information, incentive information, marketing messages, and/or other information used to incentivize or otherwise introduce a user to a product or service.

Having described an overview of the system components, attention will now be turned to various system functions that facilitate connecting fans and artists through ASAs.

System Instructions

Figure 4:
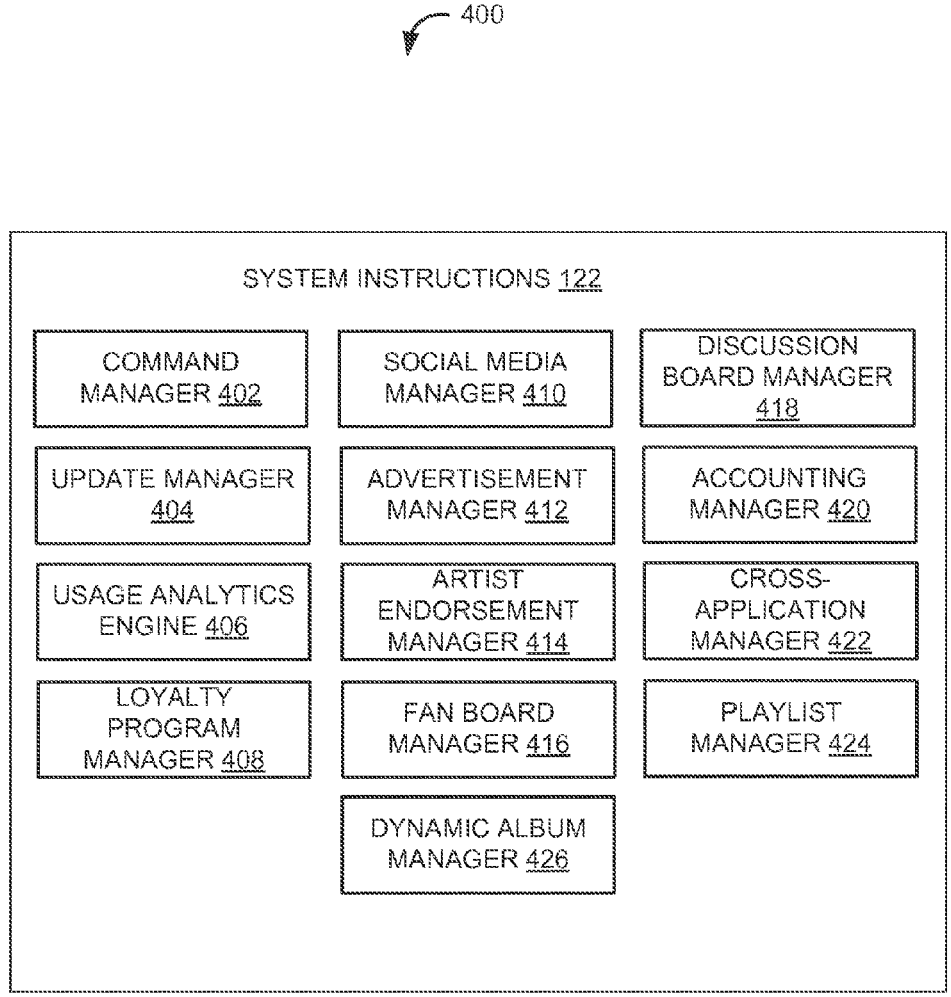
FIG. 4 illustrates a block diagram depicting system instructions for providing a platform for integrating artist specific applications, according to an implementation of the invention.

Referring to FIG. 4, which illustrates a block diagram depicting system instructions 122, in an implementation, system instructions 122 may include various sets of instructions that program computer system 110 and/or user device 170. In other words, platform management application 120 and/or an ASA 124 may include all or a portion of system instructions 122.

System instructions 122 may include different sets of instructions, such as a command manager 402, an update manager 404, a usage analytics engine 406, a loyalty program manager 408, a social media manager 410, an advertisement manager 412, an artist endorsement manager 414, a fan board manager 416, a discussion board manager 418, an accounting manager 420, a cross-application manager 422, a playlist manager 424, a dynamic album manager 426, and/or other instructions.

In an implementation, a given set of instructions described with respect to system instructions 122 may include a version that executes on computer system 110 (through platform management application 120) and a version that executes on user device 170 (through ASA 124). The version executing on computer system 110 may communicate with the version executing on user device 170. Furthermore, in an implementation, a version that executes on a first user device 170 may communicate with a version that executes on a second user device 170. Thus, the various system instructions may facilitate collaboration between computer system 110 and user device 170, and/or between one user device 170 and another user device 170.

Receiving Commands from Artists and Other Users

In an implementation, command manager 402 may obtain and execute one or more commands to be performed with respect to an ASA. The one or more commands may relate to music or content that should be changed such as being updated, added, and/or removed from an ASA. For example, the one or more commands may be received from an artist that may wish to change the music or other content provided at the ASA of the artist. The command may relate to music, messages, loyalty items, and/or other content to be changed.

Command manager 402 may obtain the one or more commands in various ways. For example, command manager 402 may receive the one or more commands via a website exposed by system 100 that provides an interface used to receive changes to be made, via an electronic communication (such as email, Short Message Service ("SMS") message, Multimedia Message Service ("MMS") message, etc.), an interface provided by an ASA, and/or other communication channel.

In whichever manner the one or more commands are received, a command may identify content that is to be changed. For example, when music is to be added (or otherwise rendered playable), the command may be associated with the music to be added. When music is to be deleted (or otherwise rendered unplayable), an identification of the music to be deleted may be provided with (e.g., specified by) the command. In some instances, the content, such as music, to be added may be stored by a content database (e.g., a database 130) such that an identifier of the content is sufficient to cause the content to be added, in which case command manager 402 may retrieve the content from the content database based on the identifier. In other instances, the content may be supplied along with the command. For example, to add new music, an artist may attach the new music to an MMS message with a command such as "add new music." Alternatively or additionally, the artist may simply specify an identification of the music to be added, assuming the system already has the music to be added.

Other commands may be used as well, such as a command to provide a message to fans, add a particular loyalty reward, and/or other command to cause other changes to occur. In some implementations, fans or users other than an artist may provide commands. In these implementations, command manager 402 may execute only a limited set of commands that are available for such users (while providing a higher level of control to artists for their respective ASAs). For instance, command manager 402 may allow other users to provide comments/messages on a message board displayed by an ASA, but not add music to the application. To distinguish between an artist and other users for such access control, command manager 402 may require user authentication (e.g., password and/or other shared secret) or provide an artist with a secret communication channel (e.g., a particular phone number to which to send text messages, or an unpublished website) for the artist.

Updating Content at ASAs

In an implementation, content manager 404 may obtain, manage, and store content related to an ASA. For example, content manager 404 may maintain a date when a message, a reward, music, and/or other content is received from an artist (or from a user). Content manager 404 may store the information in a content database for later retrieval.

Monitoring Usage and Generating Usage Analytics

In an implementation, usage analytics engine 406 may monitor and/or analyze user activity related to an ASA. For example, usage analytics engine 406 may monitor a number of times or duration that an ASA has been opened/activated, a number of times or duration a song has been played by the ASA, a number or duration in which social media content is accessed, a number of social media "likes" from the user, a number or value of purchases made, and/or other user activity in relation to an ASA that may indicate usage.

A version of usage analytics engine 406 executing on a user device 170 (e.g., via an ASA) may monitor the user activity and store the user activity in a local memory. In some implementations, a version of usage analytics engine 406 executing at the user device 170 may report the user activity to computer system 110 (e.g., to a usage analytics engine 406 executing at computer system 110).

A version of usage analytics engine 406 executing on computer system 110 may receive the user activity from various ASAs 124. For example, the user activity may be received from a first ASA 124 that relates to a first artist as well as user activity from a second ASA 124 that relates to a second artist. Thus, the version of usage analytics engine 406 executing on computer system 110 may compile usage activity across a wide range of different ASAs 124, whether or not such ASAs relate to a single artist.

The user activity may be used by computer system 110 in various ways such as by ranking ASAs, ranking content within ASA, providing loyalty items, and/or other purpose.

In an implementation, platform management application 120 may use the user activity to rank ASAs 124 based on various metrics related to user activity. For example, platform management application 120 may rank different ASAs 124 based on a number of downloads, a number of times or duration a song has been played by the ASA, a number or duration in which social media content is accessed, a number of social media "likes" from the user, a number or value of purchases made, and/or other user activity in relation to an ASA. Likewise, platform management application 120 may use the user activity to rank particular content such as songs, social media posts, etc., in a similar manner. Thus, platform management application 120 may generate listings of what ASAs or content are currently popular (e.g., within the past week, month, or other time period), trending among users, and/or otherwise gauge which applications or content are successful.

Platform management application 120 may use such popularity/trending information to provide users with what may be of interest to the user. For instance, a user may be provided with an indication of a recently trending ASA, which may encourage the user to download that application.

In an implementation, platform management application 120 may use the user activity to determine whether a loyalty item should be awarded to a user.

Managing Artist Specific Loyalty Programs and Awarding the User with Loyalty Items In an implementation, loyalty program manager 408 may award loyalty items to users in association with an ASA. A loyalty item may include a real or virtual item having a real or perceived value provided by the system, artist, and/or other entity. For example, a loyalty item may include, without limitation, a loyalty point, an achievement, a reward, and/or other items that may be obtained by the user in association with an ASA.

Loyalty program manager 408 may provide a loyalty item to the user as a reward for performing one or more user activities and/or as a purchase by the user using real or virtual currency. Loyalty program manager 408 may store (at user device 170 and/or at computer system 110) a user account of a user that tracks and maintains loyalty items provided to the user.

The user activities may include an action performed by the user in association with an ASA. For example, a user activity may include, without limitation, listening to a song, commenting on a message board, providing "likes" on content, launching or otherwise making active an application-specific application, and/or performing other activities with respect to the application-specific application.

Virtual currency may include other loyalty items (e.g., a reward may be purchased with a loyalty point and/or with real currency). For example, loyalty program manager 408 may facilitate redemption of one or more loyalty points for a reward and/or other loyalty items. In some instances, a given loyalty item may be redeemed only for another loyalty item associated with the same ASA. In other instances, a given loyalty item may be redeemed across different ASAs. In some implementations, a loyalty item may not be purchased. For example, certain loyalty items such as achievements may only be earned based on use of an ASA.

In implementations where loyalty items may be purchased, loyalty program manager 408 may store an indication of such purchase. In this manner, loyalty program manager 408 may distinguish between loyalty items that were earned and loyalty items that were purchased. For example, loyalty program manager 408 may store information used to distinguish between a loyalty point that was purchased versus one that was earned by the user.

Each artist may customize loyalty items that are made available as well as specify how users may accrue the loyalty items (e.g., a number of times that a user must listen to a song in order to obtain a loyalty item and/or an amount of real or virtual currency to obtain a loyalty item).

Loyalty program manager 408 may obtain user activity information that indicates user activities and may award the user with an appropriate loyalty item. In some implementations, loyalty program manager 408 may not provide an indication of the user activities that may be necessary to obtain a loyalty item. In such implementations, a loyalty item may be rewarded to the user as a surprise. In other implementations, loyalty program manager 408 may provide an indication of user activities that may be necessary to obtain an achievement.

Examples of Types of Loyalty Items

Having provided an overview of a loyalty program, specific, non-limiting examples of loyalty items will be described.

In an implementation, loyalty program manager 408 may provide a loyalty point. A loyalty point may indicate a level of user activity with respect to the ASA such that a user having a greater number of loyalty points has more user activity than another user having a lesser number of loyalty points. In some instances, a loyalty point may be redeemed for other loyalty items such as rewards.

In an implementation, loyalty program manager 408 may provide an achievement that corresponds to a particular type and/or volume of a user's activity. Different achievements may be awarded for different types of user activity. For example, an achievement may include an "old school" badge that indicates that the user has listened to an album cover to cover (e.g., that the ASA has played the album cover to cover), a "musical lover" badge that indicates that the user has downloaded more than five ASAs (such a badge may be displayed via all of the ASAs that the user has downloaded), and/or other types of badges. In some implementations, an achievement may not be purchased nor redeemed for other loyalty items. In such implementations, the achievement earned may indicate an actual level of user activity.

In some implementations, the achievements may be redeemable for rewards and/or merchandise offered from one or more ASAs. In such implementations, the user may redeem the achievements to obtain other loyalty items.

Loyalty program manager 408 may award a user with a reward provided by various entities such as, for example, the artist, the system, third parties, and/or other entities. A reward may include, for example, autographed photos, an exclusive chat opportunity, a wallpaper image, a ringtone, a backstage pass, a social media follow from the artist, and/or other rewards. In other implementations, the system may facilitate the provision of various rewards. The system may store various rewards, either at the server or at the user mobile device.

In some implementations, loyalty program manager 408 may provide different sets of rewards for different sets of users. For example, one set of users may be provided with an opportunity to obtain a first set of rewards while another set of users may be provided with an opportunity to obtain a second set of rewards that are different from the first set of rewards. The different sets of users may be delineated by culture, geography, and/or other characteristic of a set of users. For example, a reward for fans in Japan may include a handshake with the artist or other culturally-specific reward whereas such a handshake award may not be provided to fans in other countries.

In some implementations, loyalty program manager 408 may provide a user-specific reward that is tailored to an individual user. For example, a reward may include a recorded personal greeting to the user from the artist (e.g. "Good morning Sam"), a handwritten note to the user from the artist, and/or other customized reward. The personalized reward may include actual personalized content (e.g., a greeting actually spoken by the artist for the user) and/or content that only appears to be personalized.

In some implementations, a reward may include providing a connection between a user's social media account and an artist's social media account. For example, loyalty program manager 408 may cause a TWITTER account of the artist to "follow" a TWITTER account of the user. The association may be made automatically without intervention by the artist (e.g., loyalty program manager 408 may logon to the TWITTER account of the artist on behalf of the artist to make the connection) or may be via a request made to the artist, who then connects with the user.

Aggregating and Managing Social Media Content

In an implementation, social media manager 410 may aggregate social media content that is relevant to an artist for presentation through an ASA. For example, an artist may specify social media accounts of the artist from which to aggregate social media content. Social media manager 410 may aggregate social media posts from those social media accounts (whether posted by the artist or by other users) and provide them through an ASA for presentation to users. For example, social media manager 410 may post TWEETS from the artist, TWEETS from followers directed to the artist, and/or other social media posts made in relation to the artist's social media accounts. In this manner, users may view social media posts related to the artist using an ASA.

Social media manager 410 may aggregate the social media posts via Application Programming Interfaces ("APIs") exposed by the social media providers. In this manner, social media manager 410 may automatically obtain such posts.

In an implementation, social media manager 410 may obtain new social media posts by tracking a last time (e.g., most recent) that social media posts were provided through an ASA. In this manner, new social media posts may be obtained displayed through the ASA.

In an implementation, social media manager 410 may logon to one or more of the artist's social media accounts on behalf of the artist in order to automatically post social media content. Such automatically posted content may include, for example, promotions related to the artist (e.g., announcement of a new song, album, concert, etc.) and/or other content related to an artist.

In an implementation, a version of social media manager 410 executing at computer system 110 may aggregate and save the social media posts related to an artist. In this manner, a historical record of social media posts may be maintained and used to provide social media posts to ASA.

In an implementation, a version of social media manager 410 executing at user device 170 may aggregate the social media posts at the user device. In this implementation, user device 170 (e.g., ASA executing at user device 170) may obtain the social media posts directly from the social media providers.

By integrating social media posts of the artist for display through the ASA, the system further facilitate fan engagement and provides an easy "one-stop" solution for providing artist-related content.

Managing Advertisements

In an implementation, advertisement manager 412 may obtain advertisements from one or more advertisement provider(s) 160 for display through an ASA. Certain advertisements may be targeted for presentation at particular ASAs based on user activity. For example, advertisement manager 412 may determine a relevance of a given advertisement based on particular user activity and provide the given advertisement to a particular user device 170 executing an ASA. In an implementation, advertisement manager 412 may determine that all ASAs related to an artist should display a particular advertisement. In this implementation, advertisement manager 412 may identify user devices 170 that have installed or otherwise have used a given ASA and provide the particular advertisement to all of those user devices for display through the given ASA.

The advertisement may be displayed at one or more interfaces of ASA.

In some implementations, the advertisement manager 412 may receive advertisements from the system server. For example, the system server may communicate banner advertisements to be displayed in association with one or more ASA.

Versions of advertisement manager 412 executing at a user device 170 may locally store advertisements at the user device, whether such advertisements are provided from versions of advertisement manager 412 executing at computer system 110 and/or directly from advertisement provider(s) 160. Such implementations may allow advertisements to be displayed to the user even when user device 170 is offline.

In some implementations, advertisement manager 412 may monitor advertisement result information that indicates an effectiveness of the advertisements provided through an ASA. The advertisement result information may include a number of times a particular advertisement has been displayed, a click-through rate of the advertisement, and/or other information that indicates an effectiveness of the advertisements.

A version of advertisement manager 412 executing at user device 170 may report the advertising result information to a version of advertisement manager 412 executing at computer system 110 for centralized compilation. Such reporting may occur in real time, periodically, and/or at other times. For example, each time an advertisement is clicked or otherwise selected by a user, the version of advertisement manager 412 executing at user device 170 may report the click to the version of advertisement manager 412 executing at computer system 110. In some implementations, the version of advertisement manager 412 executing at user device 170 may store the advertisement result information and send it to the version of advertisement manager 412 executing at computer system 110 on a periodic basis and/or when a network connection is available.

In an implementation, advertisement manager 412 may perform statistical analysis of the advertisement result information. Such information may be used to further target relevant advertisements to the user and/or a population of users.

Managing Artist Endorsements

In an implementation, artist endorsement manager 414 may obtain an endorsement of an item (e.g., a product or service) from an artist. The endorsement may be in the form of an identification of the item being endorsed, an identification of an image object in a photograph or other image (e.g., a photograph of an item worn by an artist), and/or other indication of an item being endorsed.

For example, artist endorsement manager 414 may receive a photograph of the artist wearing an item to be endorsed and display the photograph through an interface used by the artist to identify the item. The artist may point to or otherwise indicate the item via the interface. Artist endorsement manager 414 may identify the item based on a bitmap of the photograph or other coordinates of the photograph at which the artist has pointed. Artist endorsement manager 414 may also receive item information such as an name of the item, a price of the item, a manufacturer or retailer of the item, a URL link to a website from which to purchase the item, a link to a redemption page in which the user may redeem one or more loyalty points to obtain the item, and/or other information related to the item.

In an implementation, artist endorsement manager 414 may display, through an ASA of the artist, a photograph of the artist holding/wearing the item in association with a tag. For example, the tag may be overlaid onto, integrated with, or otherwise displayed in association with the photograph. The tag, when clicked or otherwise selected by the user, may cause the ASA to display the item information and/or cause the linked to site (e.g., URL or redemption page) to be displayed.

In some implementations, artist endorsement manager 414 may generate user alerts when an endorsement has been made by the artist. For example, the user may receive an alert that the artist has endorsed an item or cause (e.g., a charity or charitable event). The alert may be associated with content in the ASA.

Fan Boards

In an implementation, fan board manager 416 may obtain aggregate fan information for an artist. The fan information may indicate one or more loyalty items that a given user has accrued. For example, fan information may include a ranking of users based on a number of loyalty items they have accrued. In an implementation, fan board manager 416 may exclude loyalty items that were purchased, thereby providing an indication of actual user activity rather than purchased loyalty items.

In an implementation, the fan information may relate to a particular ASA. In this manner, users of the particular ASA may be ranked with respect to other users of the particular ASA so that the top fans (for example) of a particular artist may be identified. In an implementation, the fan information may relate to multiple ASAs such that users of different ASAs may be ranked with respect to one another so that the top fans (for example) of any artist may be identified. In an implementation, the fan board may relate to a ranking of fans within a particular time period (e.g., top fans within the last month, year, etc.).

In an implementation, the fan information may be displayed as a fan board in an ASA. The fan board may relate to the artist associated with the ASA or may relate to other artists associated with other ASAs.

Discussion Boards

In an implementation, discussion board manager 418 may obtain comments from an artist, users, and/or other entities in relation to an ASA. Discussion board manager 418 may present the comments in a discussion board, which may provide a forum for the artist, users, and others to discuss and share content. Such comments may be input via an ASA, via the command manager, via a website or other interface exposed by the system, and/or other communication channel. The comments may be obtained and displayed in real time through the ASA. In some implementations, the discussion board may be updated periodically.

In some implementations, discussion board manager 418 may analyze the discussion board to parse keywords that may indicate trends, user sentiment (e.g., by comparing words in the discussion board to predefined "happy," "sad," or other sentiment terminologies), and/or other content that may be relevant. In this manner, discussion board manager 418 may mine the discussion boards for relevant information that may assist with marketing, understanding which products/songs/content resonate with users, and/or otherwise gaining insight into user preferences.

Accounting Manager

In an implementation, accounting manager 420 may maintain an artist account used to track funds due to the artist. For example, based on pre-existing agreements between the system operator and the artist (and/or predefined generic agreements), the artist may be entitled to a share of profits resulting from the monetization of the user specific application of the artist. For example, a share of ad income may be provided to the user. As such, accounting manager 420 may track ad revenue (e.g., based on ad displays, click-through-rates, etc.) in order to apportion such revenue to the artist. In some implementations, the system may credit the artist account based on user activity (e.g., the artist may be paid based on a number of downloads, number of users, number of in-app purchases made, affiliation with vendors such as when an artist endorses an item, funds related to cross-selling other applications, share of fees related to data usage from mobile operators, deals involving pre-installation on user devices, etc.).

Cross-Application Functions

In an implementation, cross-application manager 422 may facilitate cross-application functionality. For instance, cross-application manager 422 may obtain, store, or otherwise access content such as music, social media posts, rewards, and/or other information from different ASAs 124. In this manner, such content may be searched and provided to individual ASAs 124 that may otherwise be unrelated to other ASAs 124. As such, cross-application manager 422 facilitates a unified ecosystem of different ASAs 124. Furthermore, cross-application manager 422 may categorize different ASAs 124 into different groups based on musical genres, fan base (e.g., fan demographics), interests, and/or other categorizations, thereby enabling searches for (and discovery of) new and additional artists.

In an implementation, cross-application manager 422 may also support cross-application analytics. For example, cross-application manager 422 may obtain usage and analytics information across different ASAs 124 in order to assess popularity or trends. This may provide artists, studios, an operator of the system, and/or other entities with insight into user interests across a broad spectrum of ASAs 124.

Figure 5:
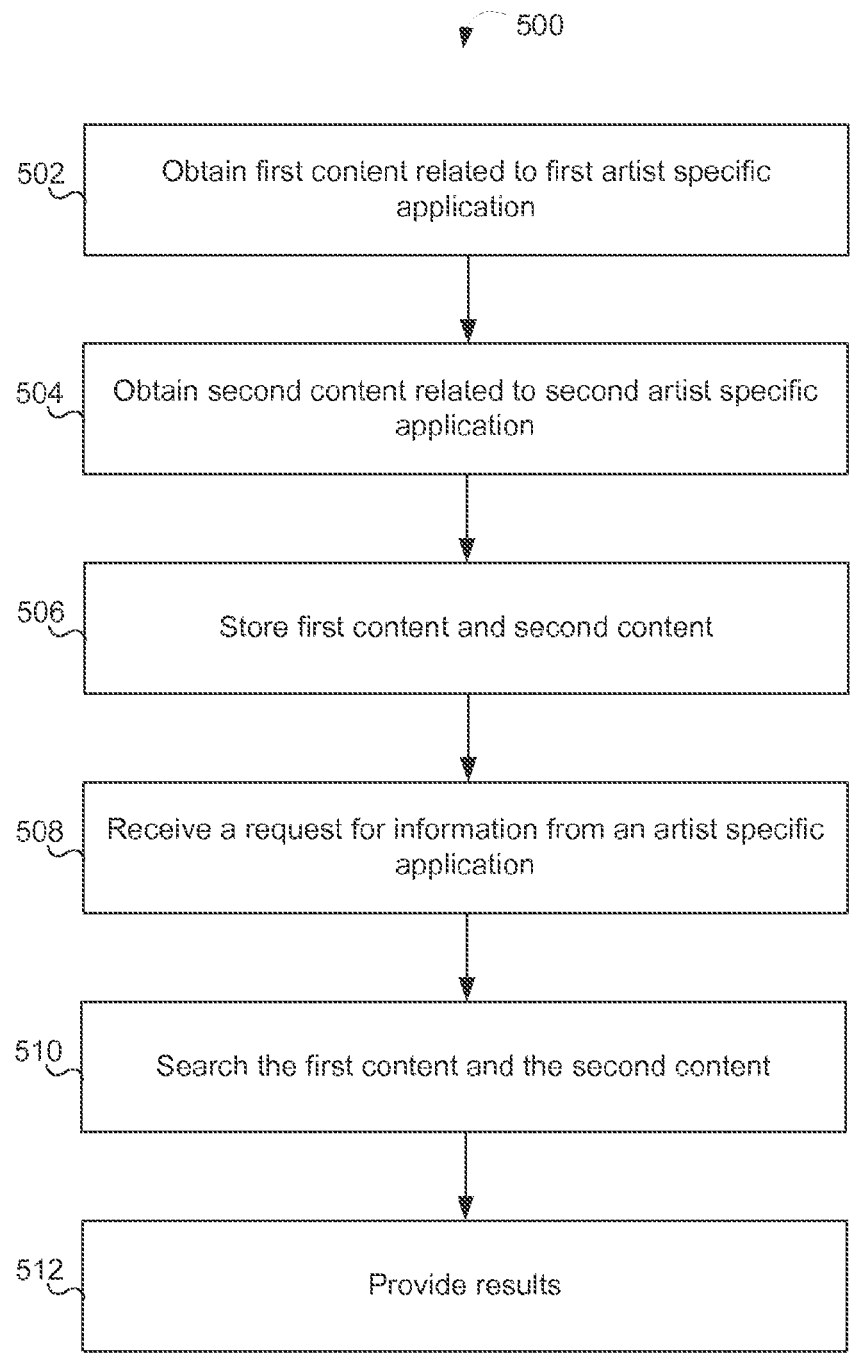
FIG. 5 illustrates a flow diagram depicting a process of obtaining, storing, and querying content related to different artist specific applications at a computer system coupled to different artist specific applications executing at different user devices, according to an implementation of the invention.

FIG. 5 illustrates a flow diagram depicting a process 500 for obtaining, storing, and querying content related to different ASAs at a computer system coupled to different ASAs executing at different user devices, according to an implementation of the invention.

In an operation 502, cross-application manager 422 may obtain first content relevant to a first ASA 124. In an operation 504, cross-application manager 422 may obtain second content relevant to a second ASA 124. The first content and the second content may each include songs, messages, social media content, and/or other content that is relevant to their respective ASAs. For example, cross-application manager 422 may obtain information related to songs of a first artist made available through an ASA of the first artist and information related to songs of a second artist made available through an ASA of the second artist. Likewise, other types of content made available through an ASA may be obtained as well.

In an operation 506, cross-application manager 422 may compile and index the first content and the second content. For example, the first content and the second content may be stored in a content database.

In an operation 508, cross-application manager 422 may receive a search request from an ASA (which may be the first ASA, the second ASA, or other ASA) or other source.

In an operation 510, cross-application manager 422 may search the content database and obtain results based on the search request.

In an operation 512, cross-application manager 422 may provide the results to the ASA or the other source.

In this manner, cross-application manager 422 may facilitate the search or display of content related to different ASAs by storing or otherwise accessing the content from different ASAs. For instance, a user may execute a search to obtain content related to ASAs, whether or not the user has installed those ASAs. The search results may identify new ASAs that may be of interest to the user, incentivizing the user to download additional ASAs related to other artists. In another example, the user may access a listing of songs of a first ASA from a second ASA. Selection of a song of the first ASA may cause that application to be launched or otherwise cause that application to stream the song to the second ASA). In this manner, the user may need not individually launch different ASAs installed on a user device 170.

In some implementations, the system may facilitate communication between only certain applications. For instance, a record label may wish for only applications specific to artists signed under its label to be permitted to communicate with one another. Of course, in other more preferred implementations, all ASAs may be permitted to communicate with one another.

As previously noted, the in-stream content management and provisioning platform may be used for various media content of which music from artists is one example. In particular, cross-application functionality described herein may be used in contexts other than music and artists as well. Cross-application manager 422 may manage content from applications that are specific to videos, text, and/or other types of media that is specific to other types of entities (other than artists), items (e.g., products, movies, etc.), and/or other subjects of an entity specific application. For example, and without limitation, television show specific applications may be created in which users may download applications specific to their favorite television shows from one or more networks. Each television show specific application installed on a user device, for example, may share information (e.g., episode listing, outtakes, cast information, etc.) to other applications. Thus, although described in the context of music shared by artists to their fans, the in-stream content management and provisioning platform (e.g., the functions and features of system 100) described herein may be used to manage other types of content in relation to other entities of subjects of an entity specific application.

Figure 6:
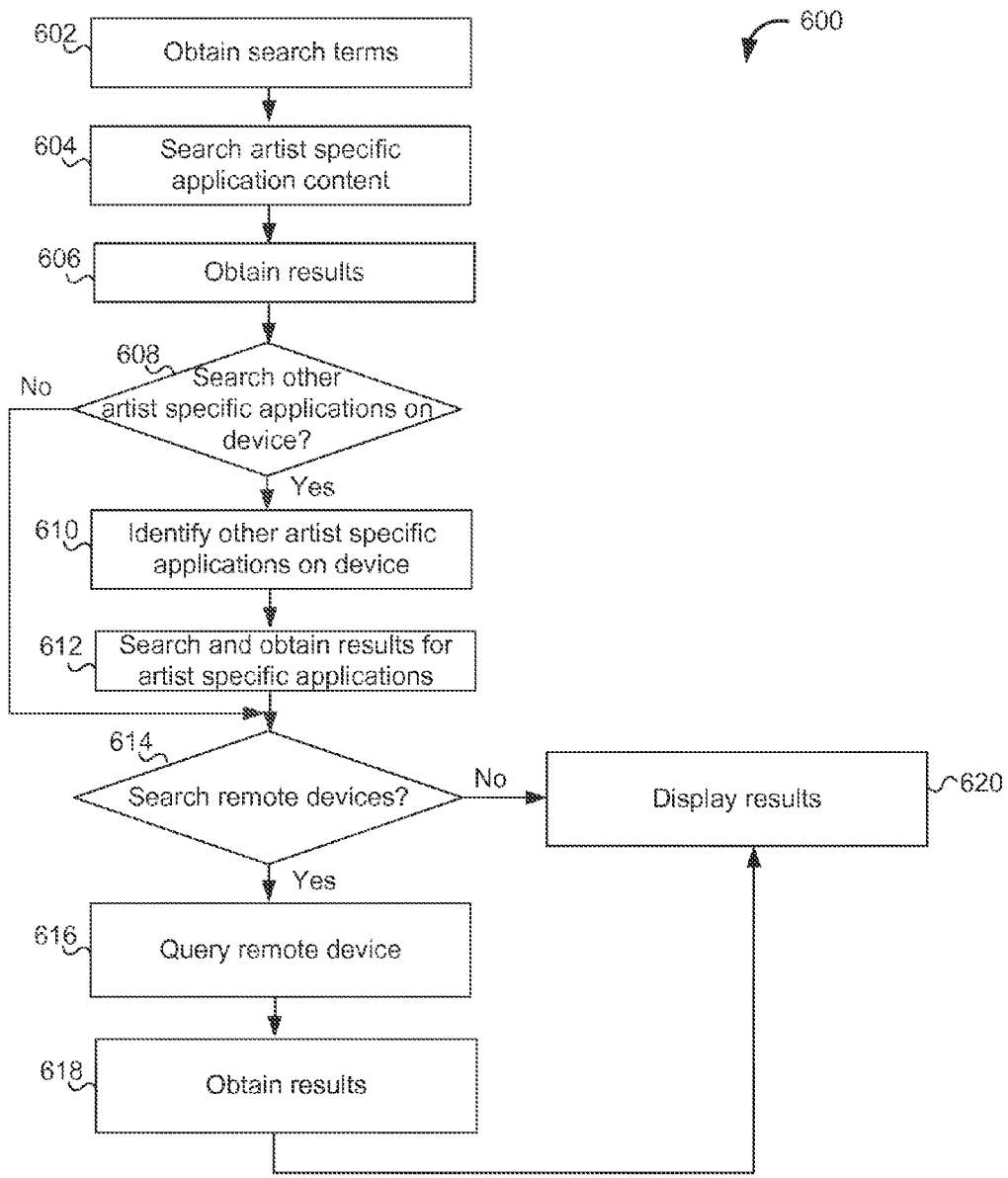
FIG. 6 illustrates a flow diagram depicting a process of querying content associated with an artist specific application from a user device, according to an implementation of the invention.

FIG. 6 illustrates a flow diagram depicting a process 600 for querying content associated with ASA 124 from user device 170, according to an implementation of the invention.

In an operation 602, ASA 124 may obtain one or more search terms relating to a request for information. In an operation 604, ASA 124 may search content (e.g., songs, social media content, messages, rewards, etc.) associated with the ASA 124. In an operation 606, ASA 124 may obtain results based on the search.

In an operation 608, ASA 124 may determine whether other ASAs on user device 170 should be searched. For example, the request for information may include a parameter that indicates sources that should be queried. Such sources may include, for example, an ASA 124 from which a search was initiated, other ASA 124 installed at user device 170, other ASAs 124 that are not installed at user device 170 but are available for download, and/or other sources that can be queried for artist-related content.

If other ASAs on user device 170 should be queried, in an operation 610, ASA 124 may identify other ASAs 124 installed on user device 170. Such identification may be obtained based on an application registry maintained by an operating system of user device 170, a registry of installed ASAs 124 that may be stored by each ASA 124 installed on user device 170, a query to computer system 110, which may maintain a registry of ASAs 124 installed at a given device, and/or other information source.

In an operation 612, the identified ASAs 124 may be queried to obtain results therefrom.

In an operation 614, ASA 124 may determine whether to search remote devices (e.g., content related to ASAs 124 not installed on user device 170). If yes, ASA 124 may query a remote device (e.g., computer system 110) in an operation 616 and obtain content based on the querying in an operation 618. In an operation 620, ASA 124 may display or otherwise provide the obtained results from the previous operations to the user.

Cross-Application Playlists

In an implementation, playlist manager 424 may allow the creation of a playlist that includes a plurality of songs from different ASAs 124 to be played in a particular order (including a preset or random order). Because a given song may only be played/access from a corresponding ASA 124, a playlist that includes songs from different ASAs 124 may cause ASAs 124 to be opened or otherwise activated when a song included therein is next in line to be played. ASAs 124 that have already played a song in the playlist may be closed to minimize a memory footprint (or each ASA 124 may remain open but be placed in a de-activated or unfocused state). Alternatively or additionally, playlist manager 424 may cause such opening and closing of ASAs 124 in order to facilitate appropriate monetization by each artist in cases where opening or activating a given ASA 124 contributes to a potential payment to be made to the artist.

A playlist may be used to play songs locally at user device 170, share the songs with other users (which may encourage the other users to download ASAs 124 included in the playlist that are not already installed at the other users' device), and/or for other purposes.

In an implementation, playlist manager 424 may generate a playlist based on an identification of a set of songs to include in the playlist. For example, the user, artist, or others may specify a playlist of songs to be included in the playlist. A given playlist may include songs from a plurality of different ASAs 124. Playlist manager 424 may obtain a playlist (e.g., a user may select a playlist to be played) and cause the set of songs to be played.

Table 1 illustrates non-limiting examples of entries in a playlist. Such a playlist may have more (or less) entries, but the illustrated playlist is illustrated with five entries for illustrative purposes. Furthermore, a playlist table may include alternative or additional types of information. The following table is therefore included solely to illustrate aspects of the disclosure and will be described in conjunction with FIGS. 7-11 that follow.

| Playlist position | Application ID | Song ID |
|---|---|---|
| $t_1$ | 1 | SID (1) |
| $t_2$ | 2 | SID (2) |
| $t_3$ | 2 | SID (3) |
| $t_4$ | 3 | SID (4) |
| $t_5$ | 1 | SID (5) |
| ... | ... | ... |
| $t_n$ | N | SID (n) |

As illustrated in Table 1, an entry in the playlist (depicted as a table row) may have an associated playlist position, an application identifier (which identifies a corresponding ASA), and a song identifier (which identifies a song to be played by the corresponding ASA).

Figure 7:
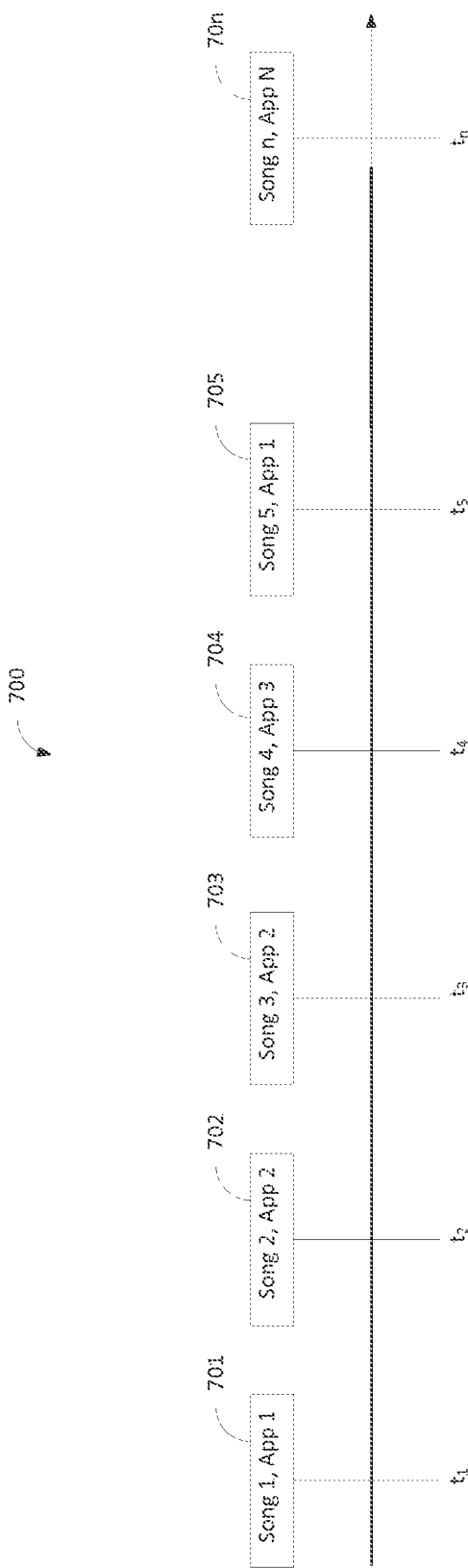
FIG. 7 schematically illustrates a non-limiting example of a playlist, according to an implementation of the invention.

FIG. 7 schematically illustrates a non-limiting example of a playlist 700, according to an implementation. Playlist 700 may include entries 701, 702, 703, 704, 705, ..., (N). Each entry may correspond to a song having a corresponding playlist position $t_{1, 2, 3, 4, 5, ..., n}$. In this example, which corresponds to Table 1, entries 701-(N) may each be associated with an Application ID and Song ID. For example, SID (1) may be associated with ASA 1, SID (2) may be associated with ASA 2, SID (3) may be associated with ASA 2, SID (4) may be associated with ASA 3, SID (5) may be associated with ASA 1, and so on and so forth.

A handoff between different ASAs may occur when adjacent songs in the playlist are associated with different ASAs. For instance, a handoff may occur between playlist positions $t_1$ and $t_2$, $t_3$ and $t_4$, and $t_4$ and $t_5$. A handoff may involve opening or otherwise activating the next ASA (which is next in line to play the next song in the playlist) and closing or otherwise de-activating a previous ASA (which completed playing a song in the playlist). For instance, after SID (1) is played, Application ID (also referred to herein and in the Figures as "App ID") 2 (the next ASA) may be opened or otherwise activated while App ID 1 (the previous ASA) may be closed or otherwise de-activated. In some implementations, the previous ASA may not be closed, memory permitting. In some implementations, a certain number of previous or next ASAs may remain open while playing songs of the playlist, which may be subject to memory limits.

The previous ASA may handoff to the next ASA in various ways. For instance, an agent associated with the previous ASA may cause the next ASA to be opened or activated while causing the previous ASA to be closed or de-activated. In some implementations, the previous ASA may cause an operating system of user device 170 to launch the next ASA with a set of launch parameters that includes information that conveys the playlist, including any parameters used to determine what song should be played next. In these implementations, each ASA may parse such launch parameters to determine whether a given song should be played next in relation to the playlist, as well as any handoffs that it should make to other ASAs.

Figure 8:
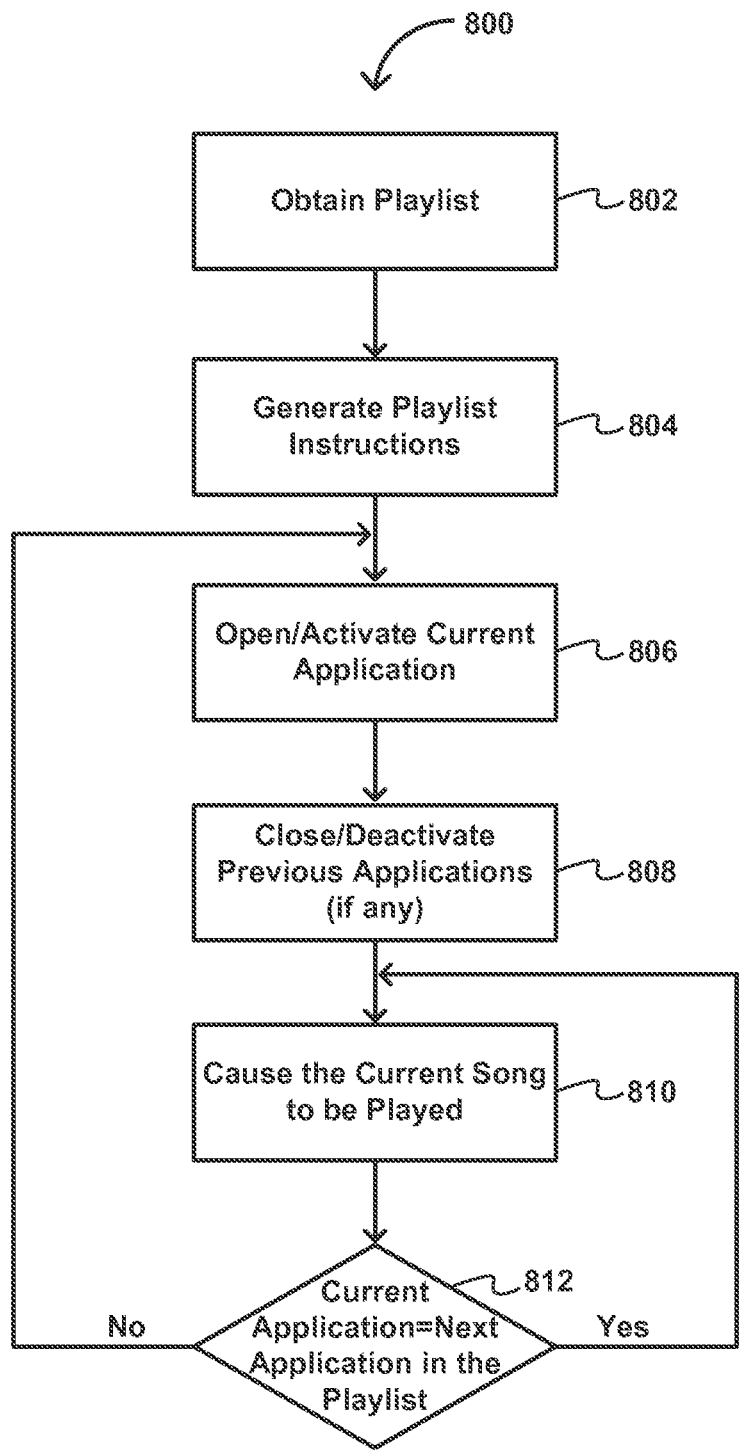
FIG. 8 illustrates a flow diagram depicting a process of switching artist specific applications to play a playlist, according to an implementation of the invention.

FIG. 8 illustrates a flow diagram depicting a process 800 for switching ASAs to play a playlist, according to an implementation of the invention.

In an operation 802, playlist manager 424 may obtain a playlist. The playlist may be created by the user, shared to the user, provided to the user by the computer system 110, and/or other obtained.

In an operation 804, playlist manager 424 may generate playlist instructions based on the obtained playlist. The playlist instructions may include information that specifies a playlist such as one illustrated in Table 1. In some implementations, the playlist may be communicated from a first ASA to a second ASA.

Playlist manager 424 may identify the ASA associated with the next song to be played.

In an operation 806, playlist manager 424 may open/activate the next ASA. In some implementations, the next ASA may be in a closed state and playlist manager 424 may open the next ASA. In some implementations, the next ASA may be running in a deactivated state in the background, and playlist manager 424 may activate the next ASA. As used herein throughout, the term "activate" may include putting into focus or otherwise placing into a state where an ASA may process instructions and play a song.

In an operation 808, playlist manager 424 may close/deactivate previous ASAs. In some implementations, playlist manager 424 may close/deactivate all the ASAs that were previously opened or activated. In some implementations, playlist manager 424 may selectively close/deactivate one or more artist applications based on the playlist. For example, playlist manager 424 may close the ASAs that do not have more songs to play. In some implementations, playlist manager 424 may keep a certain number of ASAs open/activated, memory permitting.

In an operation 810, playlist manager 424 may cause the next song to be played. The current ASA may receive the playlist table and, based on the song ID, may identify the song to be played.

In an operation 812, playlist manager 424 may determine whether the next song to be played is associated with the next ASA (e.g., the application currently open). If yes, playlist manager 424 may cause the next song to be played without opening or activating another ASA in operation 810. If no, playlist manager 424 may activate/open a next ASA in operation 806.

It should be noted that the operations of playlist manager 424 as described with respect to FIG. 8 may be included with an ASA 124 (in which case ASA 124 controls playing the playlist) or with platform management application 120 (in which case platform management application 120 controls the ASAs to play the playlist).

Figure 9:
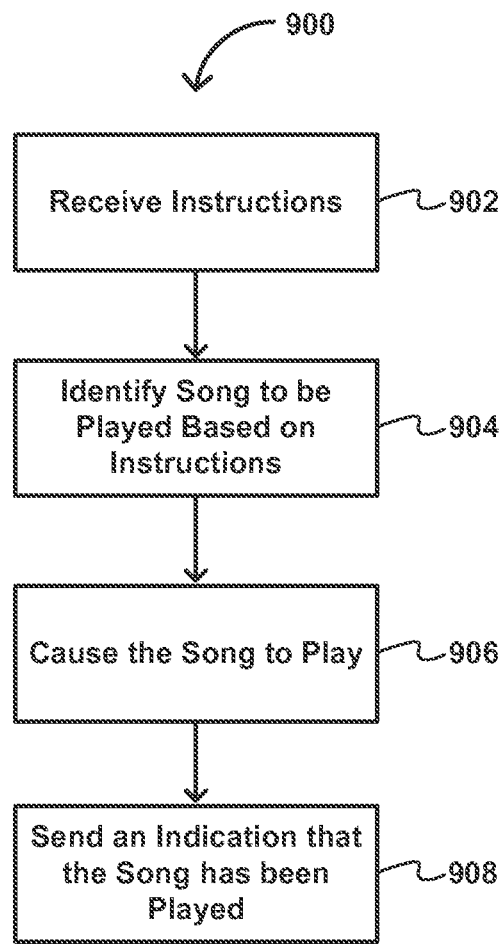
FIG. 9 illustrates a flow diagram depicting a process of switching artist specific applications to play a playlist as controlled locally at a user device, according to an implementation of the invention.

FIG. 9 illustrates a flow diagram depicting a process 900 of switching ASAs to play a playlist as controlled locally at a user device, according to an implementation of the invention.

In an operation 1002, ASA 124 may receive instructions from playlist manager 424 executing at computer system 110. In an operation 904, ASA 124 may identify, based on the received instructions, the next song to be played. For example, the instructions may include song ID that identifies the next song. In an operation 906, ASA 124 may cause the next song to be played. In an operation 908, ASA 124 may send an indication to playlist manager 424 that the song has been played.

Figure 10:
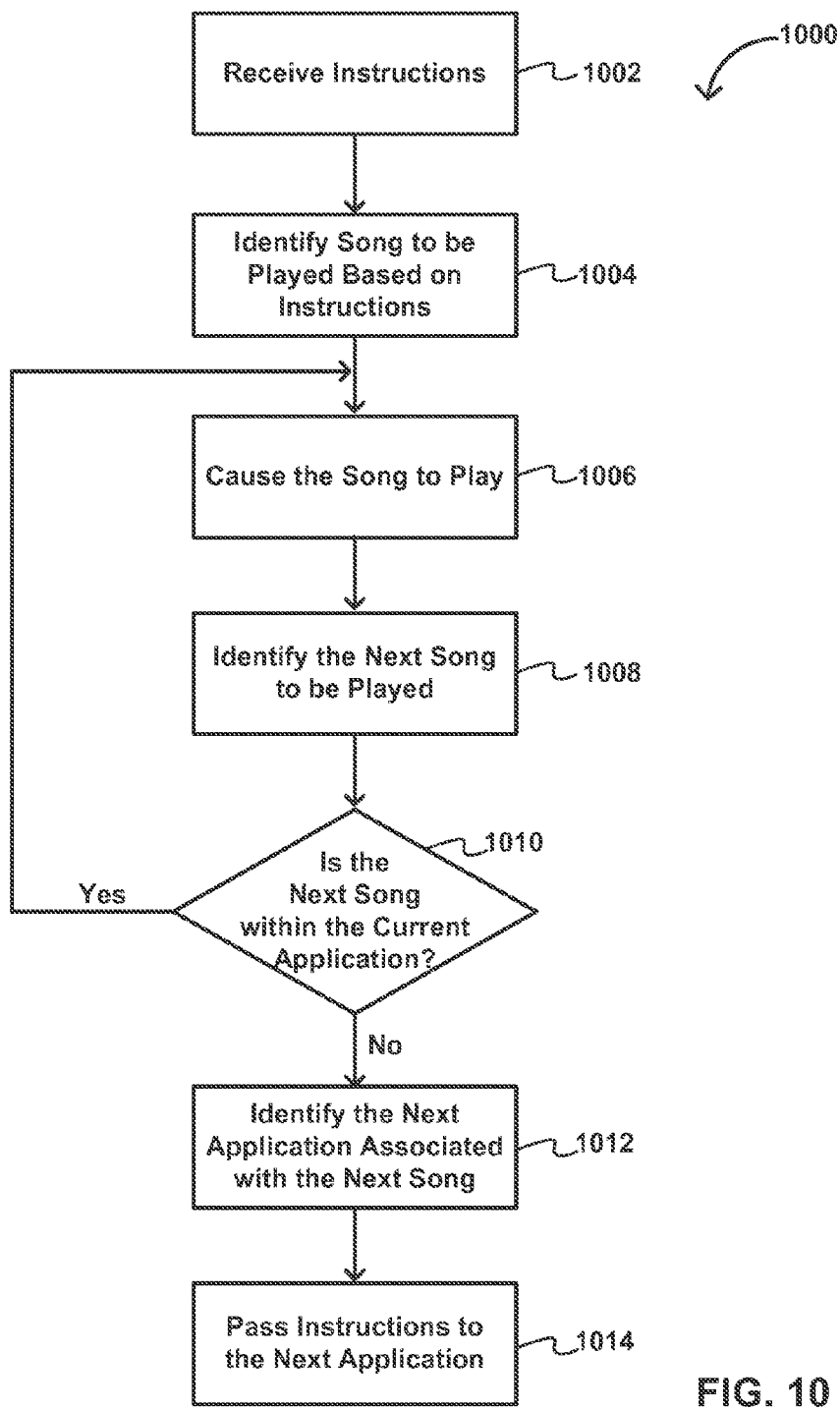
FIG. 10 illustrates a flow diagram depicting a process of switching artist specific applications to play a playlist, according to an implementation of the invention.

FIG. 10 illustrates a flow diagram depicting a process of switching ASAs to play a playlist, according to an implementation of the invention.

In an operation 1002, ASA 124 may receive playlist instructions. In an operation 1004, ASA 124 may identify, based on the received instructions, a song to be played. In operation 1006, ASA 124 may cause the song to be played. In an operation 1008, ASA 124 may identify the next song to be played. In an operation 1010, ASA 124 may determine whether the next song is within the current ASA 124. If yes, ASA 124 may cause the next song to be played in operation 1006. If no, ASA 124 may identify the next ASA associated with the next song in an operation 1012. In an operation 1014, ASA 124 may pass the instructions to the identified next ASA along with an indication of the next song to be played or may generate and provide a new set of instructions that includes the playlist and the next song to be played.

In some implementations, playlist manager 424 may account for the non-existence of one or more ASAs associated with the playlist. For example, a user may have received a playlist including songs that are associated with ASAs that are not installed on user device 170 of the user. In these implementations, playlist manager 424 may cause any missing ASAs to be installed at user device 170. In some implementations, such installation may be automatic without user intervention, may be based on input from a user (e.g., after having prompted the user to download any missing ASAs), and/or based on some other trigger.

Figure 11:
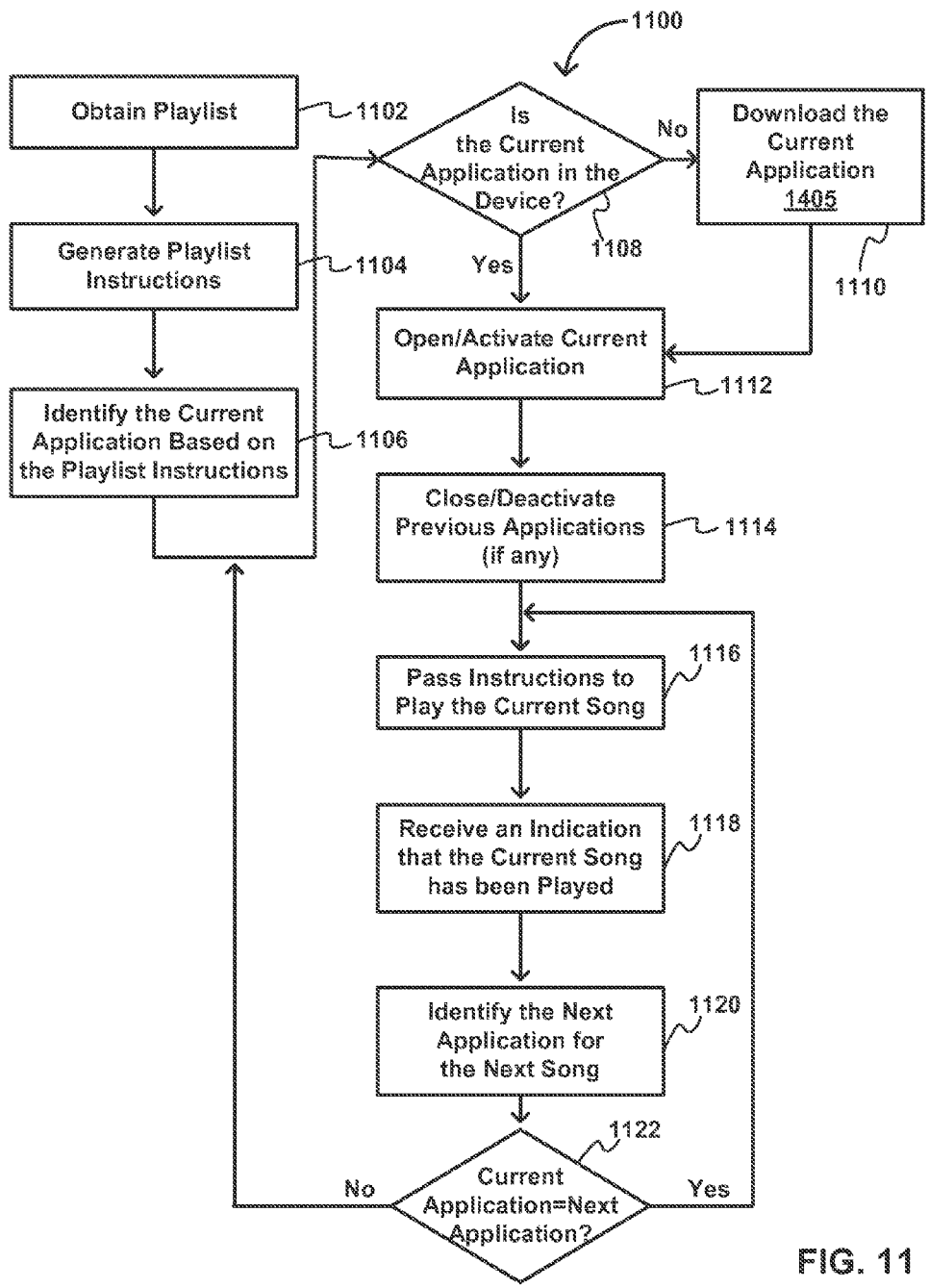
FIG. 11 illustrates a flow diagram depicting a process of switching artist specific applications to play a playlist, according to an implementation of the invention.

FIG. 11 illustrates a flow diagram depicting a process 1100 of switching ASAs to play a playlist, according to an implementation of the invention.

In operation 1102, playlist manager 424 may obtain the playlist as described in various implementations above. In operation 1104, playlist manager 424 may generate playlist instructions, as described in various implementations above. In operation 1106, playlist manager 424, based on the playlist instructions, may identify the current ASA that includes the next song to be played. In operation 1108, playlist manager 424 may check if the identified current ASA is in the mobile user device. If no, the process moves to operation 1110 in which ASA 124 may be downloaded from the system server. If yes, the process may skip operation 1110 and move to operation 1112. In operation 1112, playlist manager 424 may activate/open the current application, as described in various embodiments described above. In operation 1114, playlist manager 424 may close/deactivate previous applications, as described in various embodiments above. In operation 1116, playlist manager 424 may pass instructions to the current ASA to play the current song. In operation 1118, playlist manager 424 may receive an indication that the current song has been played. In operation 1120, playlist manager 424 may identify the next ASA associated with the next song. In operation 1122, playlist manager 424 may check whether the next application is same as the current application. If yes, the process moves to operation 1116 in which playlist manager 424 may pass instructions to the current ASA to play the next song. If no, the process moves to operation 1108 in which playlist manager 424 may check if the next application exists in user device 170.

In some implementations, the user mobile device may be out of memory and may not be able to download one or more ASAs. In such implementations, playlist manager 424 may notify the user that the user mobile device is out of memory. Playlist manager 424 may request the user to clear up the requisite memory and try again. In some implementations, playlist manager 424 may download ASAs 124 as far as the memory can allow. In some implementations, playlist manager 424 may optimize the download based on the memory of the user mobile device. For example, playlist manager 424 may download ASAs 124 that occupy relatively less memory in the user mobile device.

In some implementations, a user may broadcast his/her playlist. For example, a user may share a playlist with his/her friends, with all the users, and/or any other subset of users. In some implementations, playlist manager 424 may receive the playlist and may cause any ASAs associated with the playlist to be installed at user devices with which the playlist have been shared (and which do not have the ASAs already installed).

In some implementations, one or more users may co-listen to a playlist. For example, the user may invite friends to listen to songs from the playlist, which may be streamed from the user device 170, from computer system 110, and/or other device via network 102. In some implementations, a user with whom the playlist has been shared (and who is co-listening to the playlist) may be invited to download all or a subset of the ASAs associated with the playlist. Responsive thereto, the user may elect to install all or a portion of the ASAs.

As previously noted, the in-stream content management and provisioning platform may be used for various media content of which music from artists is one example. In particular, playlist functionality described herein may be used in contexts other than music and artists as well. Playlist manager 424 may manage playlists related to other types of content such as videos, text, and/or other types of media that is specific to other types of entities (other than artists), items (e.g., products, movies, etc.), and/or other subjects of an entity specific application. For example, and without limitation, movie studios may provide different movie specific applications in which users may download applications specific to their favorite movies. A playlist in the foregoing example may include a series of trailers, movie clips, audio clips, and/or other content made available through movie specific applications, which may be activated or de-activated as described herein. Thus, although described in the context of music shared by artists to their fans, the in-stream content management and provisioning platform (e.g., the functions and features of system 100) described herein may be used to manage other types of content in relation to other entities of subjects of an entity specific application.

Creating and Managing Dynamic Albums

In an implementation, dynamic album manager 426 may create and maintain one or more dynamic albums. A dynamic album may include a set of songs provided through an ASA 124 installed at user device 170. The dynamic album may be stored at the user device 170 (e.g., in the manner as described herein with respect to music). Nevertheless, dynamic album manager 426 may modify the set of songs without intervention by the user of user device 170. Thus, while a user may be able to listen to a dynamic album at the user device 170 even without a network connection, dynamic album manager 426 may maintain control over the dynamic album. In some implementations, the dynamic album may be subject to one or more music leases as described herein.

Dynamic album manager 426 may modify the dynamic album based on one or more album parameters that specify a change to be made to the set of songs. For example, the one or more album parameters specify the removal of one or more songs from the dynamic album, the addition of one or more new songs, the replacement of one or more songs, a rearrangement of (e.g., shuffling) the order of one or more songs, and/or other change to the set of songs.

As used herein and described more fully below, a song that is "added" to a dynamic album may actually be added such that instructions that encode the new song are provided to the ASA, which incorporates the new song into the ASA or otherwise stores the new song such that it is unplayable outside of the ASA. Alternatively, a song may be "added" by merely providing an indication to include a song already stored at the ASA to be added to the dynamic album. Likewise, a song that is "deleted" may actually be deleted or may simply be associated with an indication that indicates that the deleted song should not be played in association with the dynamic album (even though instructions encoding the song remain stored at the ASA).

The album parameters may be specified by an artist via command manager 402 described herein. In this manner, an artist may use the features and functions of a dynamic album to send music and/or other updates to the dynamic album. For example, the artist may introduce new songs, delete old songs, replace one version of a song with another version of the song, present snippets of songs in production, re-arrange an order in which the songs of a dynamic album are played, specify a first song to be played, and/or otherwise change the dynamic album. As another example, the artist may send an audio and/or a video message (e.g., commentary, uncut versions of the song, outtakes, etc.) to be played in association with the dynamic album.

From the user's perspective, the dynamic album may be modified without the user's intervention so that the user may listen to one version of a dynamic album at a first time and listen to another version of the dynamic album at a later time after the dynamic album has been changed by the artist (or other user/entity). In other implementations, the user may be granted some control over whether a dynamic album is updated. Furthermore, in some implementations, the user may be granted control over what songs/music/content is retained by a given ASA 124. For example, the user may choose to retain only a subset of songs (including only one song) provided by ASA 124, enabling the user to select songs that the user wishes to retain subject to a music lease.

In some implementations, the dynamic album may start playing when the ASA is launched. For example, a first version of the dynamic album may be played when the ASA is launched at a first time and a second version of the dynamic album may be played when the ASA is launched at a later time after the dynamic album has been changed. In some implementations, the dynamic album may start playing when the user launches (e.g., starts playing) the dynamic album in the ASA.

Figure 12:
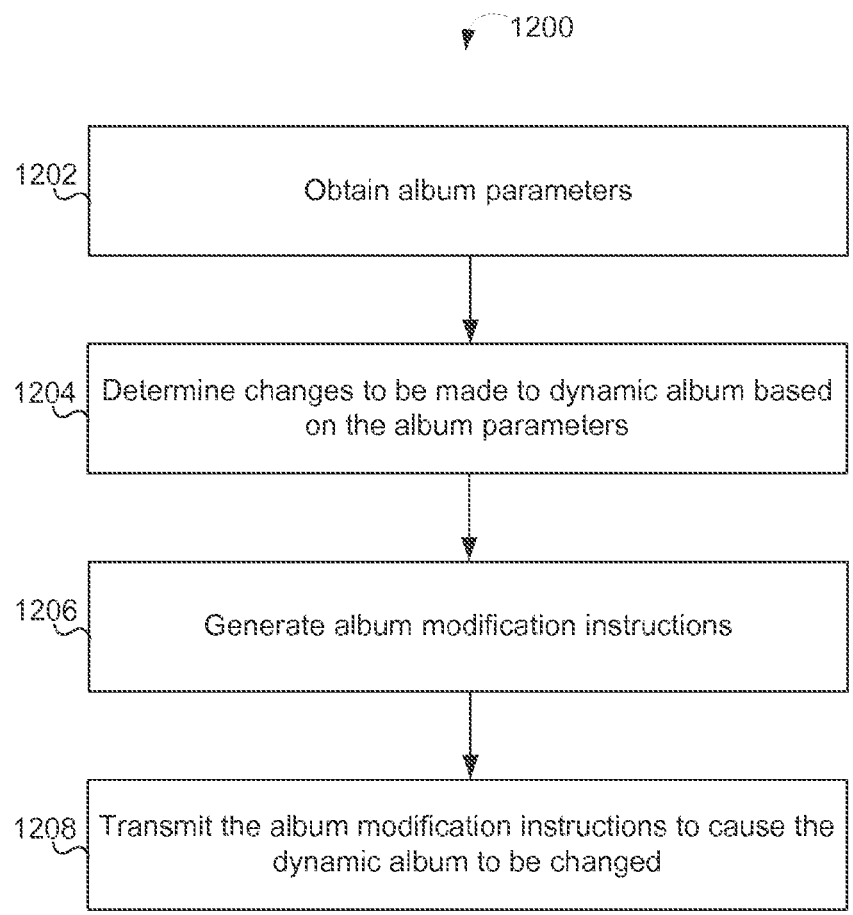
FIG. 12 illustrates a flow diagram depicting a process for changing a dynamic album at user devices based on album parameters received from an artist, according to an implementation of the invention.

FIG. 12 illustrates a flow diagram depicting a process 1200 for changing a dynamic album at user devices based on album parameters received from an artist, according to an implementation of the invention.

In an operation 1202, dynamic album manager 426 may obtain one or more album parameters. For example, dynamic album manager 426 may receive the one or more album parameters from an artist via a communication channel provided by command manager 402.

In an operation 1204, dynamic album manager 426 may determine one or more changes to be made to the dynamic album based on the album parameters. For instance, dynamic album manager 426 may identify a new song to be added to the dynamic album, a song to be removed from the dynamic album, and/or otherwise identify one or more changes to be made to the dynamic album.

In an operation 1206, dynamic album manager 426 may generate album modification information that indicates the changes to be made. The album modification information may include the album parameters and/or otherwise include information that indicates the one or more changes to be applied.

In an operation 1208, dynamic album manager 426 may transmit the album modification information to the relevant ASA. The ASA may then apply the changes to the dynamic album. In some implementations, such changes are applied without the user's consent or intervention. In other implementations, the ASA provides the user with an opportunity to reject such changes.

Dynamic album manager 426 may identify user devices 170 (e.g., an ASA executing on a user device 170) to which the album modification information should be provided. For example, first album modification information relating to a first ASA may be provided to user devices 170 that have the first ASA installed thereon, while second album modification information relating to a second ASA may be provided to user devices 170 that have the second ASA installed thereon.

A user device 170 may be identified based on a communication received from the user device 170 and/or based on a registry of user devices that have downloaded ASAs. An ASA installed on a user device 170 may periodically provide a communication to a version of dynamic album manager 426 executing on computer system 110 (e.g., to request a new music lease or otherwise simply check-in each time the ASA is launched, expressly request the album modification information, etc.). The communication may include information used to identify the user device (e.g., a MAC address), the ASA (e.g., an application identifier, an application version, etc.), and/or other information used to determine that a given ASA is installed at the user device.

Responsive to the communication, dynamic album manager 426 may determine whether album modification information should be provided to the user device 170 (e.g., based on whether the album modification information relates to the ASA that is communicating with dynamic album manager 426). If so, then dynamic album manager 426 may provide the relevant album modification information to the user device. Other factors may affect the determination of whether to provide the album modification information, such as whether the ASA is using a current version of the dynamic album, as described more fully below.

In an implementation, dynamic album manager 426 may identify one or more user devices that have downloaded the ASA and may push the album modification information to relevant devices. For example, in an implementation, dynamic album manager 426 may query a database that stores indications of devices that have previously downloaded the ASA related to the dynamic album.

In some implementations, the album parameter may indicate a delete operation to delete one or more songs from one or more albums in the ASA. To that end, the dynamic album manager may generate album modification instructions that include the delete operation. Based on the album modification instructions, the dynamic album manager may cause the deletion of one or more songs from the memory of the user mobile device.

In some implementations, the album parameter may indicate an add operation to add one or more songs to one or more albums in the ASA. To that end, the dynamic album manager may generate album modification instructions that include the add operation. Based on the album modification instructions, the dynamic album manager may cause the addition of one or more songs to the memory of the user mobile device.

In some implementations, the album parameter may indicate a replace operation to replace a first song with a second song in one or more albums in the ASA. To that end, the dynamic album manager may generate album modification instructions that include the replace operation. Based on the album modification instructions, the dynamic album manager may cause the replacement of the first song with the second song in the memory of the user mobile device.

In some implementations, the dynamic album manager may generate the album modification instructions to replace a first song with a second song as a combination of delete and add operation, according to the various implementations described above. For example, the album modification instructions may include a delete operation to delete the first song from a dynamic album, and an add operation to add the second song to the dynamic album.

The artist, using the replace operation, may replace a first song in a dynamic album with a second song. For example, the artist may want to replace a song with an entirely different song. As another example, the artist may want to replace a studio-recorded song with a song recorded during a live concert. As another example, the artist may want to replace a short or a trial version of a song with the full version. As another example, the artist may want to replace an older version of the song with a re-mastered, re-conducted, or a re-mixed version of the song, Alternatives to Actually Adding or Deleting Songs In some implementations, a version of dynamic album manager 426 (e.g., part of the ASA) executing at a user device 170 may cause the ASA to maintain an album indicator for each of the songs in the dynamic album. The dynamic album manager may cause the ASA to set the album indicators to accomplish various operations included in the album modification instructions.

For example, when the ASA receives album modification instructions to delete one or more songs from the album, the ASA may set the album indicator for the one or more songs to indicate that the one or more songs are not to be played when the dynamic album is played. Alternatively, the ASA may set the album indicator for one or more undeleted songs to indicate that the one or more songs are to be played when the dynamic album is played. Alternatively and/or additionally the ASA may set the indicators for the one or more deleted songs to indicate that the deleted one or more songs are not to be played and to set the indicators for the undeleted one or more songs to indicate that that the undeleted one or more songs are to be played when the dynamic album is played. In some implementations, one or more songs that are indicated not to be played may not be seen by the user of the mobile device. In some implementations, one or more songs that are indicated not to be played may be seen by the user of the mobile device.

As another example, the ASA may receive album modification instructions to add one or more songs to the album. In some implementations, the one or more songs to be added may already be present in the memory of the user device but with its album indicator set to not be played when the dynamic album is played. In these implementations, the ASA may update the album indicator to indicate that the one or more songs are to be played when the dynamic album is played. As such, the version of dynamic album manager 426 executing at computer system 110 may not transmit the one or more songs to be added along with the album modification instructions.

In some implementations, the one or more songs to be added may not exist in the memory of the user mobile device. In such implementations, the one or more songs to be added may be included in or provided together with or separately from the album modification instructions. In such implementations, the ASA may receive the album modification instructions and may add the one or more songs to the memory of the user device 170.

As another example, the ASA may receive album modification instructions to replace a first song with a second song. The replace operation may be accomplished by a combination of delete and add operations, according to various embodiments described above.

In some implementations, the album indicator may include a binary setting (e.g., a '0' may indicate that the associated song is not to be played when the dynamic album is played and a '1' may indicate that the associated song is to be played when the dynamic album is played). In other implementations, the indicator may be non-binary. The value of the indicator may be used to represent one of several possible states. For example, one value may indicate one or songs to be "not to be played, can be seen by the user" while another value may indicate one or more songs to be "not to be played, cannot be seen by the user." In some implementations, the indicators may indicate the sequence in which the songs are to be played.

In some implementations, the album modification instructions may indicate a shuffle operation be performed to modify the sequence of songs to be played in the dynamic album. In some implementations, the artist may specify one or more shuffle criteria. For example, the artist may specify that the most recent song has to be played first, followed by the second most recent, and so on. In some implementations, the artist may randomize the order of songs as a shuffle criterion. In some implementations, the shuffle operation may be combined with add, delete, and/or replace operations as described in various implementations above. In some implementations, the shuffle operation may be accomplished by setting the indicators to change the sequence in which the songs are to be played.

As previously noted, the in-stream content management and provisioning platform may be used for various media content of which music from artists is one example. In particular, dynamic album functionality described herein may be used in contexts other than music and artists as well. Dynamic album manager 426 may provide, for example, different movie trailers, clips, and/or other content related to movie specific applications. Thus, although described in the context of music shared by artists to their fans, the in-stream content management and provisioning platform (e.g., the functions and features of system 100) described herein may be used to manage other types of content in relation to other entities of subjects of an entity specific application.

Dynamic Album Version Control

In some implementations, dynamic album manager 426 may account for different versions of the dynamic album existing on an ASA of a user device 170. The different versions may result from, for example, user device 170 not receiving an album modification instruction, not applying an album modification instruction, or otherwise being unable to synchronize its version of the dynamic album with the current version. In some implementations, dynamic album manager 426 may obtain the dynamic album version stored at the user device 170 and may compare the obtained version with the current version at computer system 110. For example, the ASA may provide the dynamic album version to dynamic album manager 426. Based on the comparison, dynamic album manager 426 may generate and provide album modification instructions to the user device 170 to account for any differences.

Figure 13:
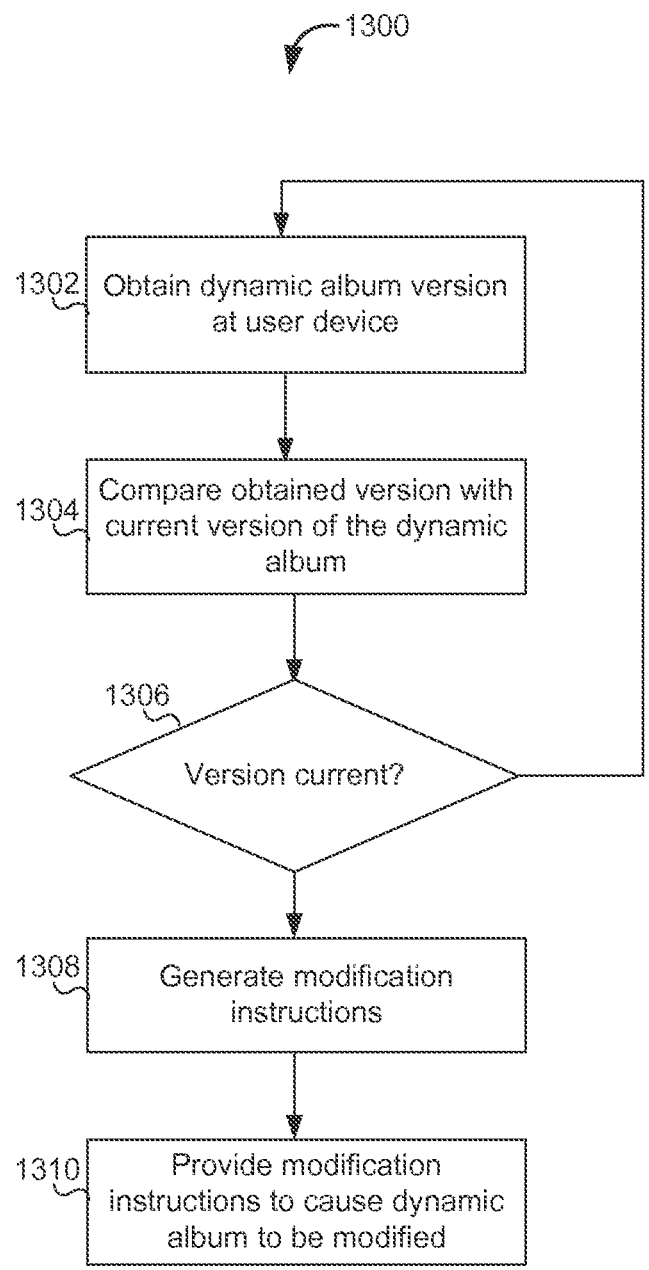
FIG. 13 illustrates a flow diagram depicting a process for accounting for different versions of a dynamic album associated with an artist specific application at a user device, according to an implementation of the invention.

FIG. 13 illustrates a flow diagram depicting a process 1300 for accounting for different versions of a dynamic album associated with an ASA at a user device 170, according to an implementation of the invention.

In an operation 1302, dynamic album manager 426 may obtain the version of the dynamic album associated with an ASA at user device 170. In some implementations, dynamic album manager 426 may communicate, to user device 170, a request to send the version information of a dynamic album. In some implementations, dynamic album manager 426 may receive, from user device 170, a communication that includes the version information of a dynamic album.

If the version information is received, in an operation 1304, dynamic album manager 426 may compare the received version with the current version. In an operation 1306, if the received version is current, processing may loop back to operation 1302 or may terminate. If the received version is not current, in an operation 1308, dynamic album manager 426 may generate album modification instructions based on the comparison. In some implementations, the album modification instructions may include add, delete, and/or replace operations to account for the difference between the received version and the current version. In some implementations, the modifications instructions may include operations for a complete replacement of the dynamic album at user device 170 with the current version.

In an operation 1310, dynamic album manager 426 may cause the dynamic album at user device 170 to be modified based on the album modification instructions. In some implementations, dynamic album manager 426 may communicate the album modification instructions to user device 170. In some implementations, dynamic album manager 426 may access the memory of the user device 170 to modify the dynamic album based on the album modification instructions.

In some implementations, the dynamic album manager 426 may store the differences between the successive versions of the dynamic album. For example, dynamic album manager 426 may store a delta that indicates a change from one version to the next version of the dynamic album. A series of deltas may therefore be applied in order to determine the current state of a dynamic album. Alternatively or additionally, whole copies of a given version of a dynamic album may be stored and marked with a corresponding version identifier.

In some implementations dynamic album manager 426 may receive a communication from user device 170 that indicates the user device does not have enough memory for the modification of the dynamic album. The user may be requested to try again after freeing up the memory required for the update or otherwise additional attempts may be made periodically.

In some implementations, dynamic album manager 426 may receive a communication including an amount of free memory for the dynamic album. In such implementation, dynamic album manager may communicate instructions to user device 170 to provide an option to the user for a partial modification. A partial modification may apply modifications as far as the memory can allow. For example, delete and replace operations, according to various implementations, may be applied but an add operation may not be applied. In some implementations, dynamic album manager 426 may optimize the album modification instructions so that a memory footprint required to carry out the album modification instructions is minimized. For example, delete operations may be performed before add operations.

In some implementations, one or more users of the ASAs may wish to control the modifications to the dynamic albums. To that end, dynamic album manager 426 may cause the ASA to provide options to the user to configure the dynamic modifications. In some implementations, the user may modify the dynamic album manually. In some implementations, the user may allow the modification of dynamic album periodically, for example, once every week, or once every month. In some implementations, the user may want only the "major" modifications, for example, when the artist adds or replaces more than five songs. In some implementations, dynamic album manager 426 may cause the ASA to allow the users to indicate that the one or more songs are not to be replaced or deleted. In some implementations, dynamic album manager 426 may cause modifications to be applied only when the dynamic album is not currently playing.

User Interfaces Provided by an ASA

Having described the various implementations of the system, attention will now be turned to examples of functions and interfaces provided by an ASA. As previously noted, a given ASA may be installed at a user device 170. An ASA may include some or all of system instructions 122. As such, some or all of system instructions 122 may program user device 170 as well.

Figure 14:
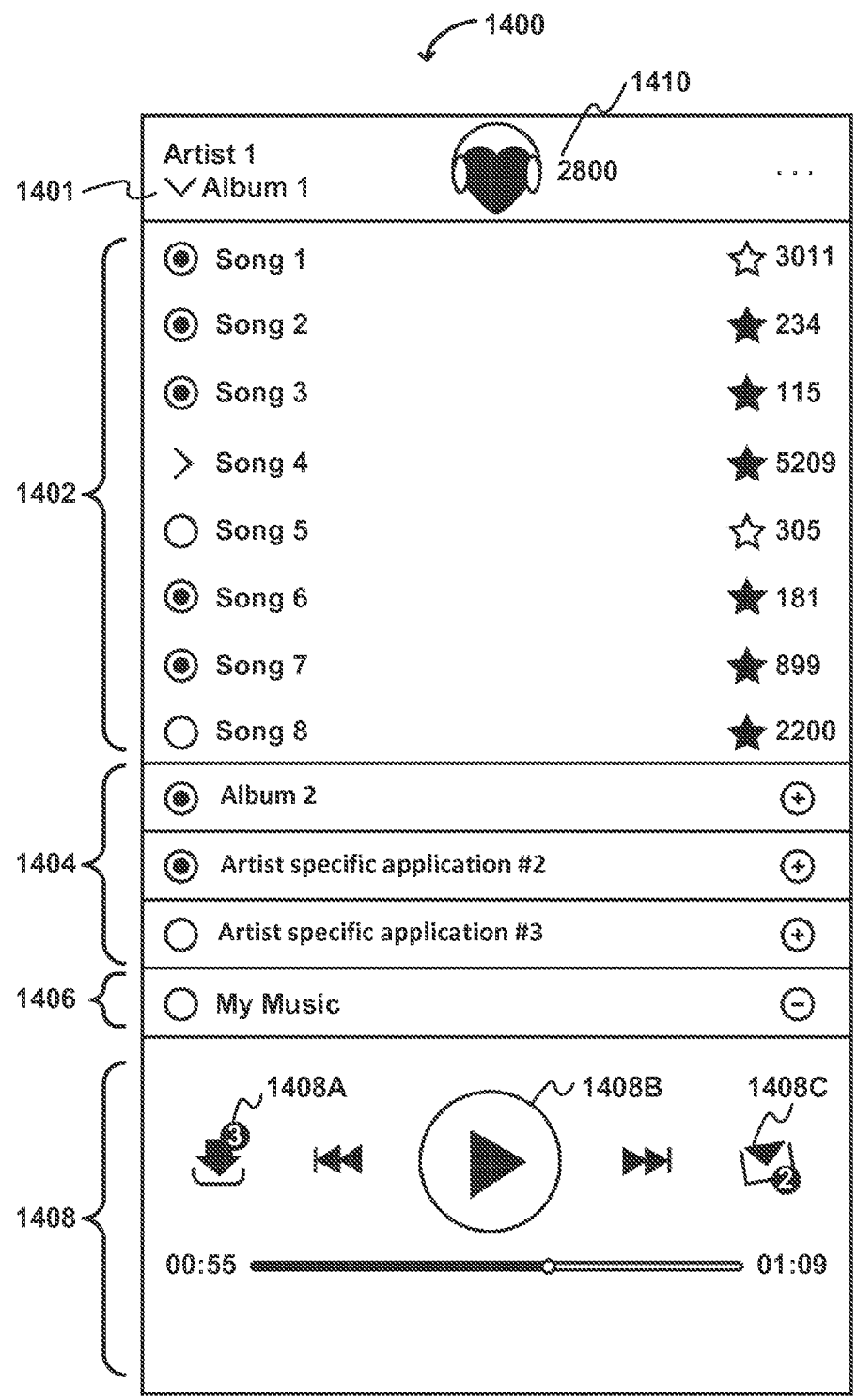
FIG. 14 illustrates a non-limiting example of a screenshot of a unified player interface that plays music from an artist specific application and/or music not associated with the artist specific application, according to an implementation of the invention.

FIG. 14 illustrates a non-limiting example of a screenshot of a unified player interface 1400 that plays music from an ASA and/or music not associated with the ASA, according to an implementation of the invention.

The screenshot illustrated in FIG. 14 and other drawing figures are for illustrative purposes only. Various components may be added, deleted, moved, or otherwise changed so that the configuration, appearance, and/or content of the screenshots may be different than as illustrated in the figures. Accordingly, the graphical user interface objects as illustrated (and described in greater detail below) are exemplary by nature and, as such, should not be viewed as limiting. Furthermore, as would be appreciated, the various components of unified player interface 1400 may cause certain commands to be performed at or data provided to ASA (e.g., locally at a user device) and/or remote devices such as a computer system 110.

The unified player interface 1400 may include a section 1402 that displays a plurality of songs that are associated with an ASA (e.g., songs that are not playable outside of the ASA). The songs listed in section 1403 may correspond to an album 1401. In an implementation, album 1401 includes a dynamic album that may be changed by the artist with or without user intervention as described herein.

The songs in section 1402 may be associated with indicators of popularity (illustrated in FIG. 14 as stars with a corresponding number that indicates a number of users that have "liked" the song). Filled-in stars (or other differentially displayed indicators) may indicate that the user has liked a corresponding song as well.

Section 1404 may display other ASAs installed in user device 170. Selection of another ASA may cause music from the selected application to be played. In some implementations, such selection may cause the selected application to be launched and its unified player interface to be launched as well, essentially replacing the unified player interface 1400. In a sense, such selection may cause a handoff from one ASA to another ASA.

In some implementations, sections 1402 and 1404 may together represent a playlist described herein, where different songs from different ASAs in a playlist cause handoffs between ASAs to occur.

Section 1406 may display music that is not associated with an installed ASA. For example, unified player interface 1400 may search for locally stored music and display them for selection in section 1406. Upon selection of such locally stored music, unified player interface 1400 may play the selected music, delivering a seamless experience for users who have locally downloaded music and ASAs. In some implementations, section 1406 may include streaming music sources as well.

Section 1408 may display controls used to quickly access downloaded songs/ASAs through icon 1408a, music playback controls 1408b, and messages through icon 1408c. Selection of icon 1408a may cause the ASA to display a selectable list of ASAs installed at user device 170. Selection of a downloaded ASA may cause a handoff to that application. Selection of icon 1408c may cause the ASA to display alerts or other messages that the user has received.

Figure 15:
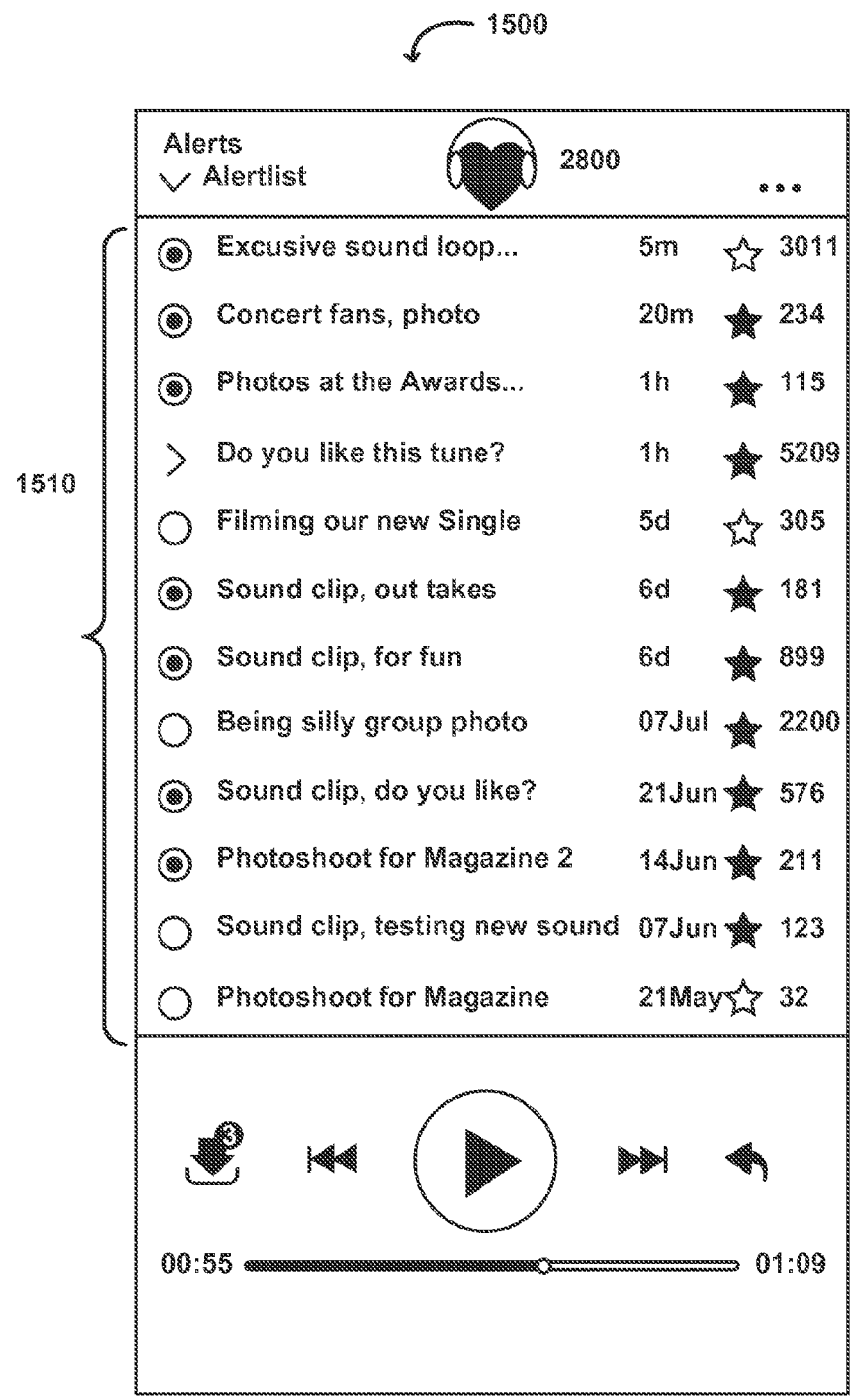
FIG. 15 illustrates a non-limiting example of a screenshot of an interface for displaying content updates, according to an implementation of the invention.

FIG. 15 illustrates a non-limiting example of a screenshot of an interface 1500 for displaying content updates, according to an implementation of the invention. The interface 1500 may include section 1502 that displays a plurality of updates. In some implementations, the plurality of updates may include an alert for exclusive sound loop. In some implementations, the alert may include instructions to identify the exclusive sound loop existing in the ASA. In some implementations, the alert may include instructions to generate an exclusive sound loop form a combination of various portions of a plurality of songs. For example, an exclusive sound loop may include a combination of chorus from song A, chorus from song B, introduction from song C, and/or any other portions of a plurality of songs. In some implementations, the exclusive sound loop may be received by the ASA in association with the alert.

In some implementations, the plurality of alerts may include an alert inquiring whether the user likes a tune. In some implementations, the alert may include instructions to identify the tune existing in the ASA. In some implementations, the tune may be received by the ASA in association with the alert.

In some implementations, the plurality of alerts may include an alert associated with a sound clip. The sound clip may be received by the ASA in association with the alert. In some implementations, the alert may include an inquiry on whether the user likes the sound clip.

The plurality of alerts may include alerts for photographs, videos, and/or any other content provided to the user.

Section 1510 may also display the date/time when the alert was received. For example, an alert may be received 5 minutes ago, 6 days ago, at a certain date, and/or any other date/time. Section 1510 may also display the number of times the alert has been dubbed a favorite, indicated by the number of stars. The dark stars may indicate that the user has tagged the alert as a favorite, and the white stars may indicate that the user has not tagged the alert as a favorite.

Figure 16:
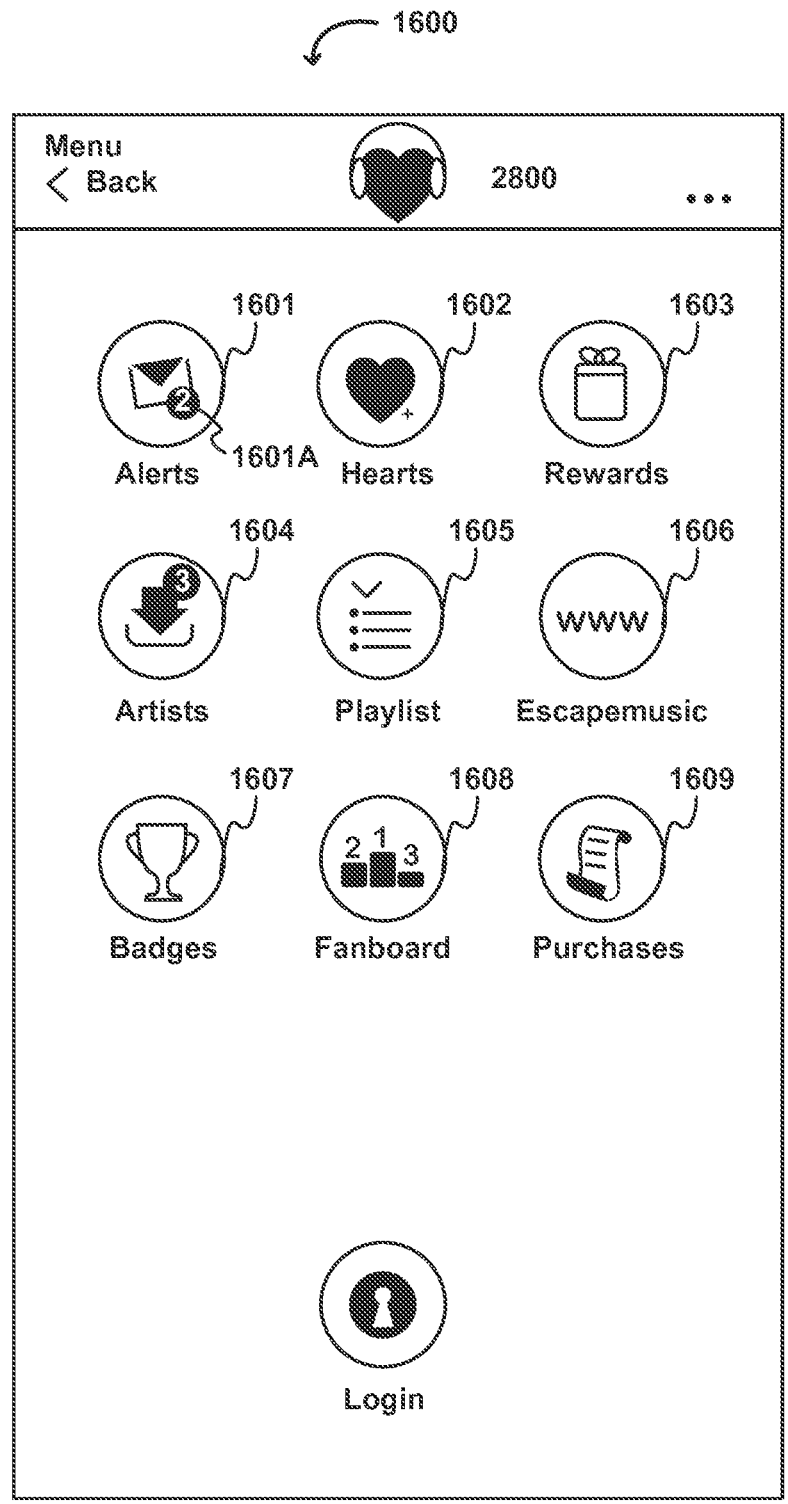
FIG. 16 illustrates a non-limiting example of a screenshot of an interface for displaying a plurality of menu icons associated with an artist specific application, according to various implementations.

FIG. 16 illustrates a non-limiting example of a screenshot of an interface 1600 for displaying a plurality of menu icons associated with an ASA, according to various implementations.

Menu icon 1601 may display the number of alerts 1601a the user has received. Selecting the menu icon 1601 may cause the ASA to display interface 1700 that displays messages.

Menu icon 1602 may be associated with a loyalty item such as a "heart" as illustrated. Selecting the menu icon 1602 may cause the ASA to display a number of loyalty items accrued by the user.

Selecting the menu icon 1603 may cause the ASA to display interface 1800 that displays rewards available for redemption. Menu icon 1604 may display the number of ASAs 1604a installed at user device 170. Selecting the menu icon 1604 may cause the ASA to display ASAs installed at user device 170. The ASA may allow the user to switch to one of the other ASAs, which may cause a handoff to occur.

Selecting menu icon 1605 may cause the ASA to display playlists described herein. In some implementations, selecting menu icon 1605 may cause the ASA to display unified player interface 1400.

Selecting the menu icon 1606 may cause the ASA to display the website of the associated with an operator of the system. Selecting the menu icon 1607 may cause the ASA to display achievements such as badges accrued by the user. Selecting the menu icon 1608 may cause the ASA to display a fan board interface 1900 that display a fan board.

Selecting the menu icon 1609 may cause the ASA to display the purchases made by the user from one or more ASAs and/or interface 1800. Selecting the menu icon 1610 may cause the ASA to display a log in interface for the user to log into the ASA.

Although described with respect to icons that represent various other interfaces, the various interfaces described herein may be navigated by swiping a touchscreen (or performing another user interface action) to scroll through the various interfaces.

Figure 17:
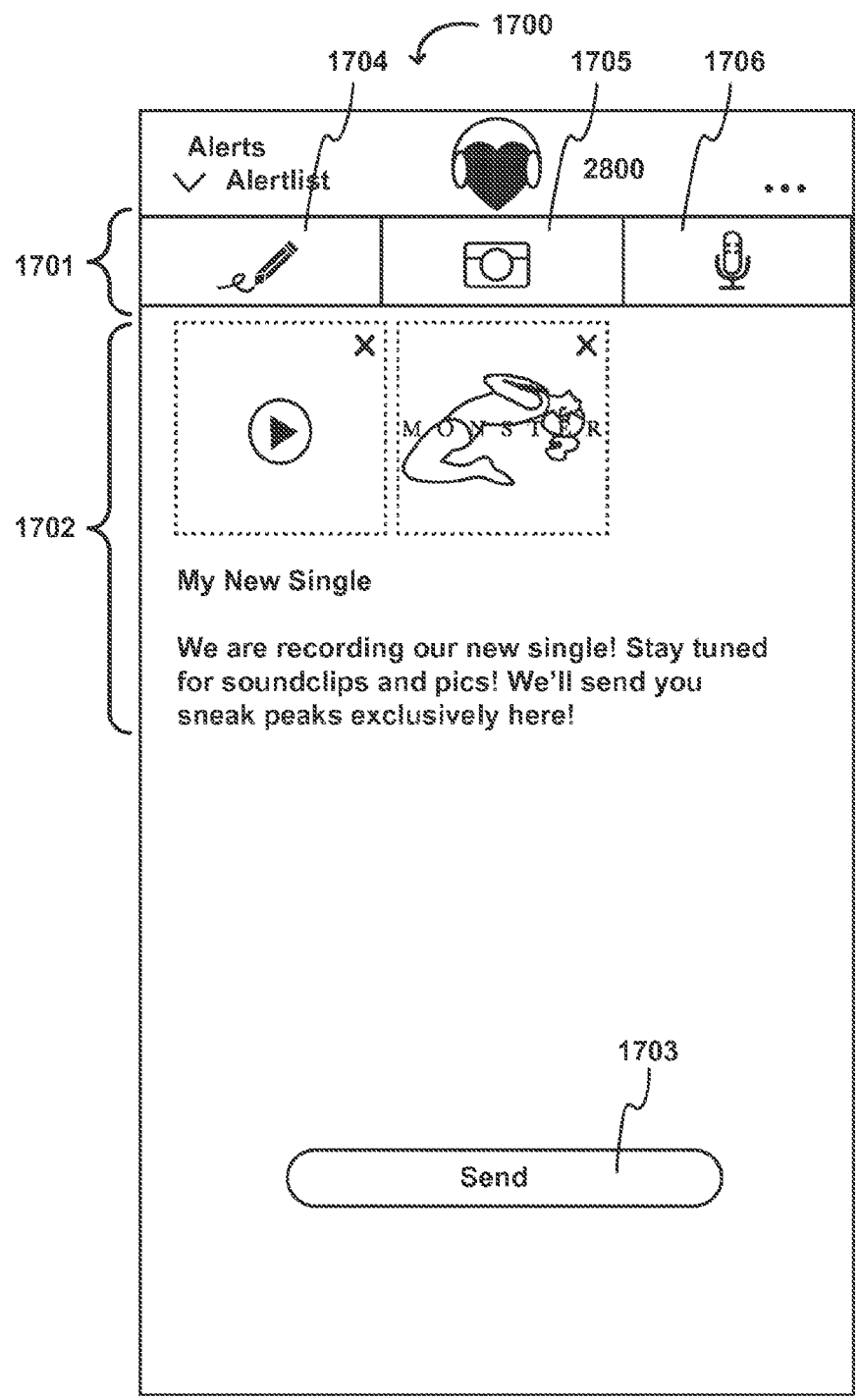
FIG. 17 illustrates a non-limiting example of a screenshot of an interface for displaying messages received by the user, according to an implementation of the invention.

FIG. 17 illustrates a non-limiting example of a screenshot of an interface 1700 for displaying messages received by the user, according to an implementation of the invention. Section 1702 may display details of a message. Section 301 may include a number of input methods to create a message, such as an icon 304 that represents a text input, an icon 305 that represents an image/camera input, or an icon 306 that represents a voice input. Other types of input may be used as well. Icon 303 may allow the user to transmit a message (whether text, image, audio, and/or other format) to the artist (or other users).

Figure 18:
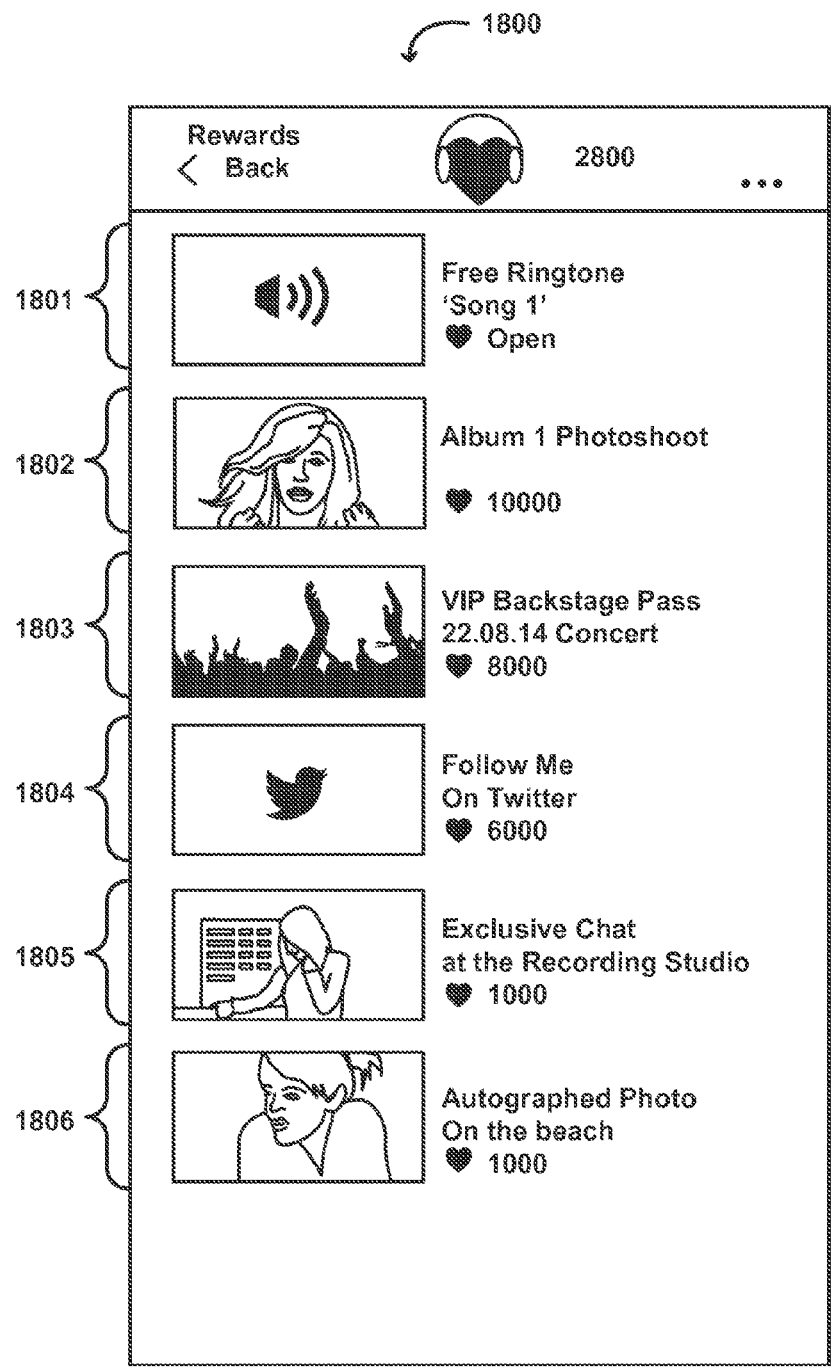
FIG. 18 illustrates a non-limiting example of a screenshot of an interface that facilitates redemption of one or more loyalty points for a reward, according to an implementation of the invention.

FIG. 18 illustrates a non-limiting example of a screenshot of an interface 1800 that facilitates redemption of one or more loyalty points for a reward, according to an implementation of the invention. The interface 1800 may include a plurality of sections 401, 402, 403, 404, 405, and 406 that each displays information associated with an individual reward. Within a given section may display an avatar (e.g. a picture, image, and/or other representation) associated with the reward, a name of the reward, a description of the reward, and a number of loyalty points required to obtain the reward.

Figure 19:
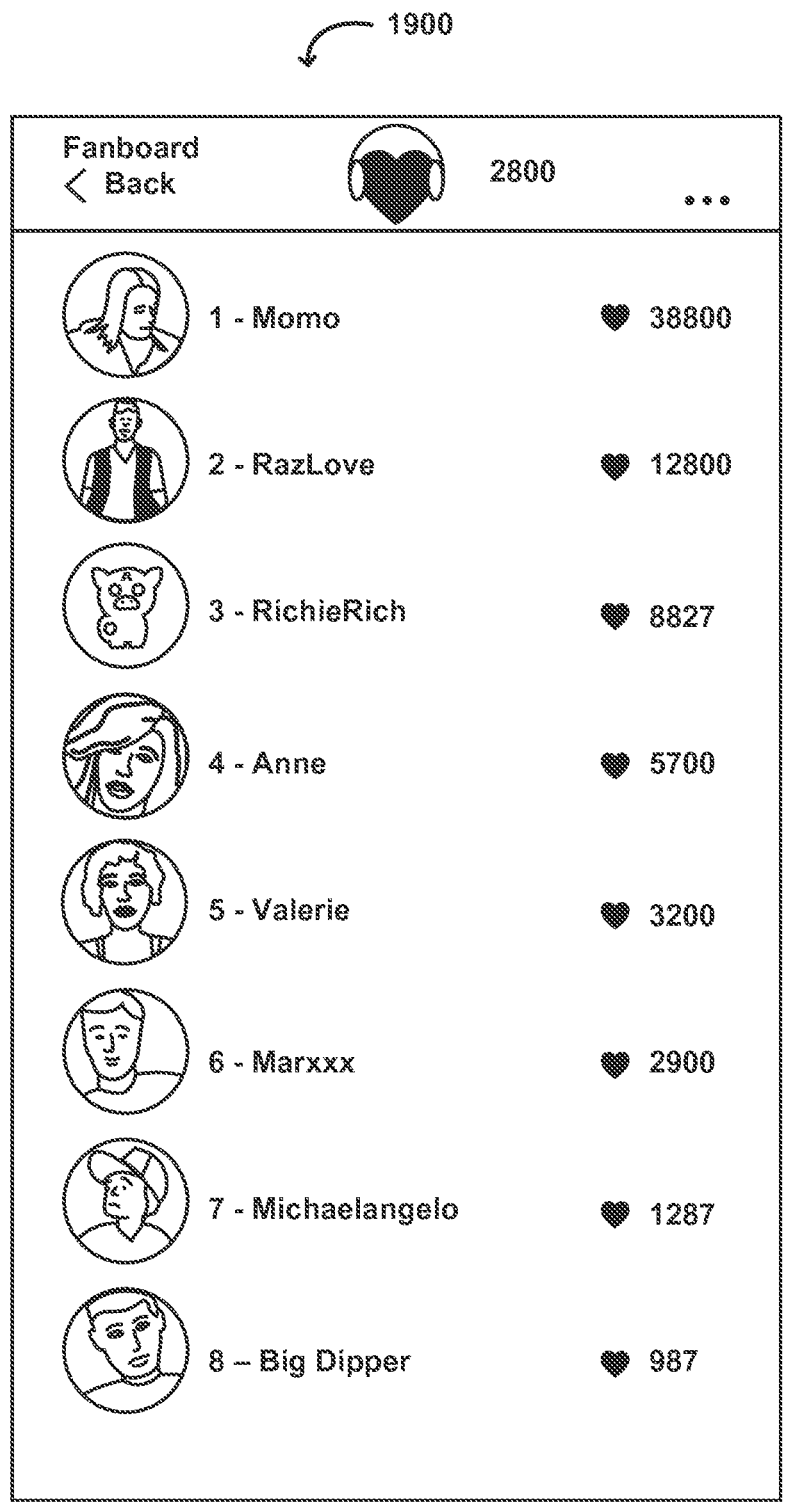
FIG. 19 illustrates an example of the fan board display, according to an implementation of the invention.

FIG. 19 illustrates an example of the fan board display 1900, according to an implementation of the invention. The exemplary fan board display facilitates the user to see the aggregate fan information of the artist associated with the ASA.

The fan board display 1900 may include the top fans of the artist based on the aggregate fan information. In some implementations, the fan board manager may communicate to the system server, the user activities associated with an ASA. The system server may use the information on the user activities to generate the fan boards.

Figure 20:
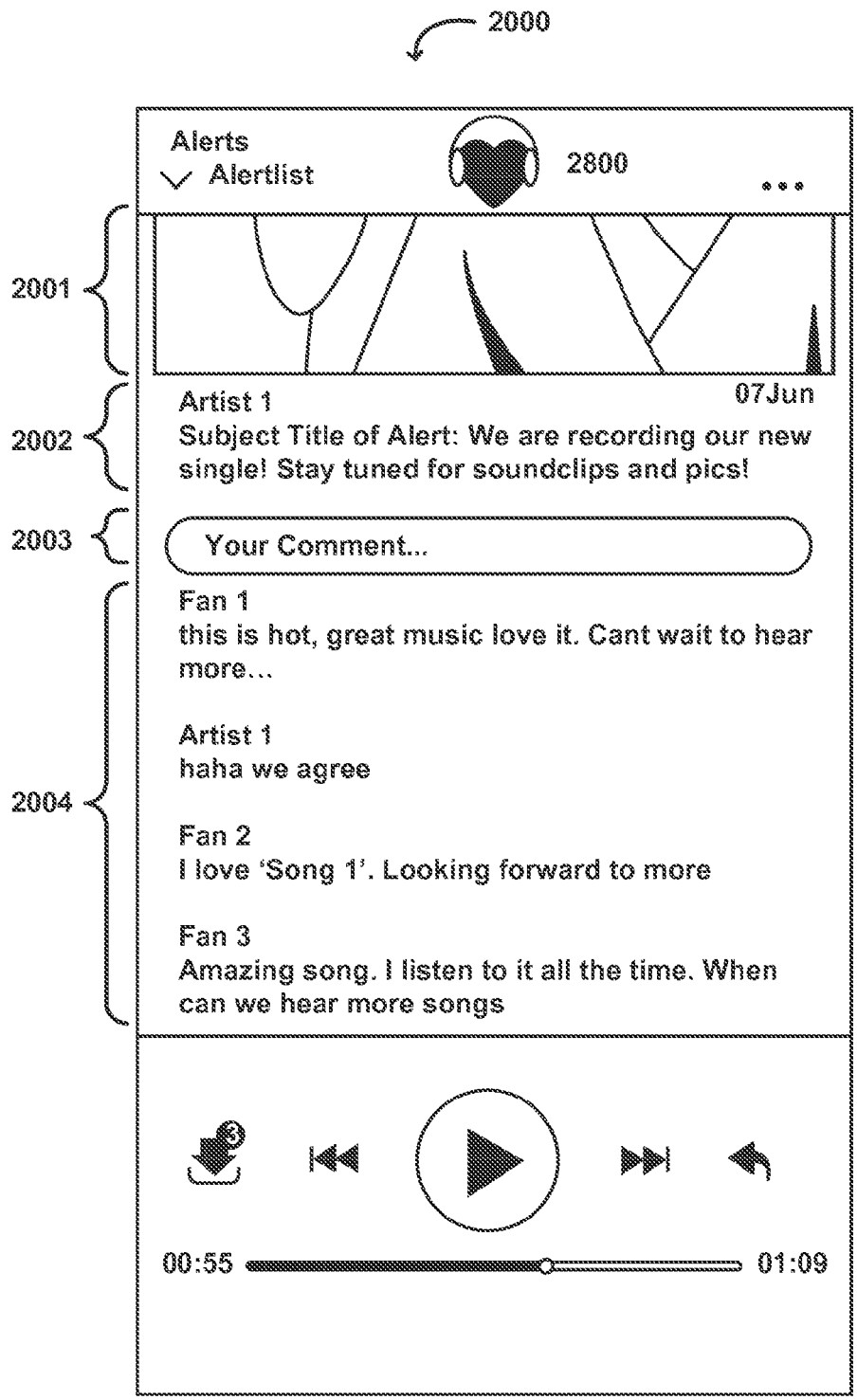
FIG. 20 illustrates a non-limiting example of a screenshot of an interface 2000 for displaying the discussion board to which users and the artist may post messages, including content such as music, according to an implementation of the invention.

FIG. 20 illustrates a non-limiting example of a screenshot of an interface 2000 for displaying the discussion board to which users and the artist may post messages, including content such as music, according to an implementation of the invention. The interface may include an avatar 2001 (e.g. a picture, image, and/or other representation) associated with the artist, a message 2002 from the artist, a comment window 2003 for the user to provide a comment, and a feed 2004 of messages made by users and replies/comments by the artist.

Figure 21:
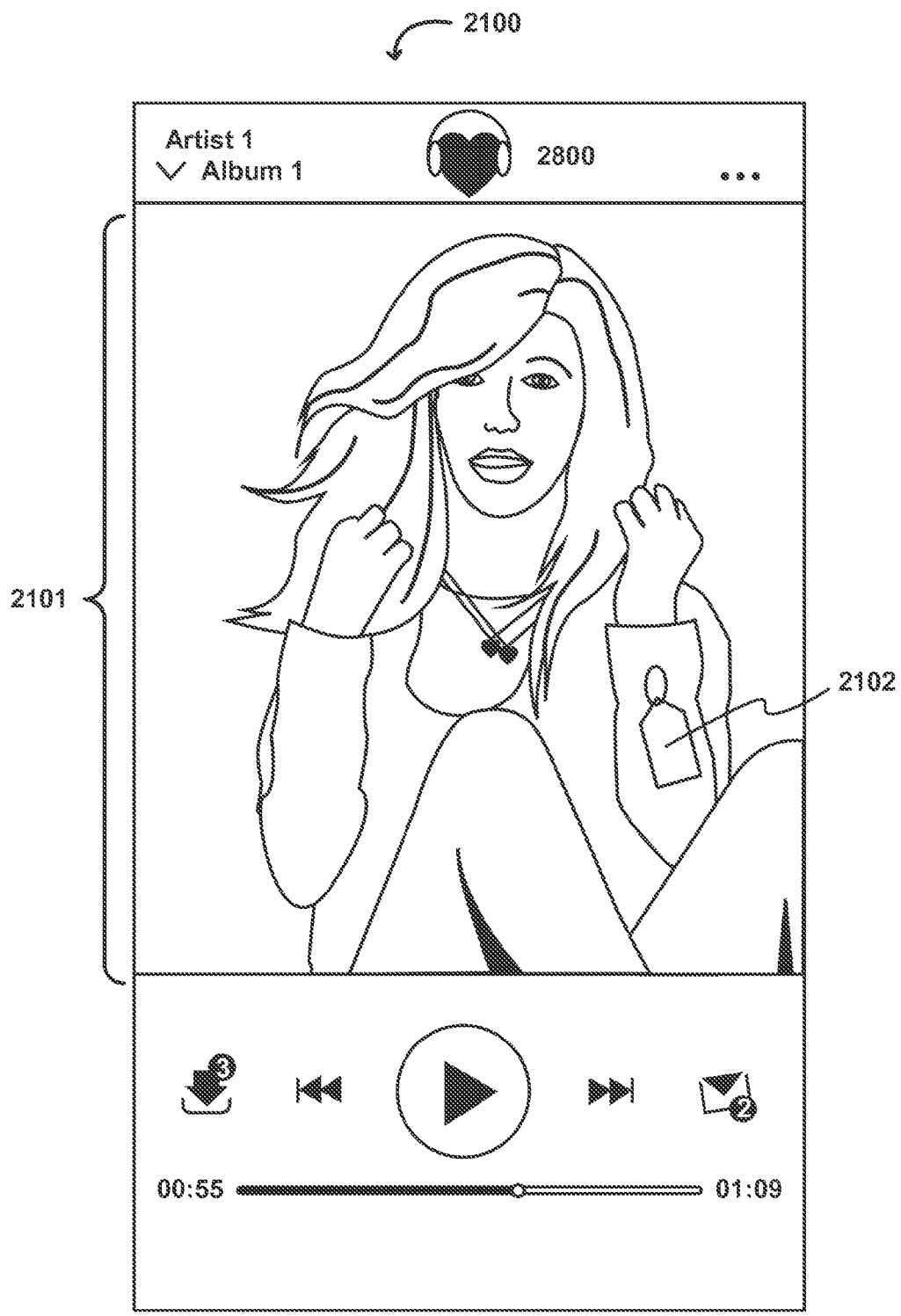
FIG. 21 illustrates a non-limiting example of a screenshot of an interface for displaying the affiliation of the artist with one or more merchandise items, according to an implementation of the invention.

FIG. 21 illustrates a non-limiting example of a screenshot of an interface 2100 for displaying the affiliation of the artist with one or more merchandise items, according to an implementation of the invention. The interface 2100 may include a merchandise tag 2102 associated with an image 2101 of the artist holding/wearing the merchandise item. Upon selection of merchandise tag 2102, information related to the tagged merchandise (e.g., manufacturer, style, color, size, etc.) may be displayed and/or an interface to purchase the tagged merchandise may be displayed.

Figure 22:
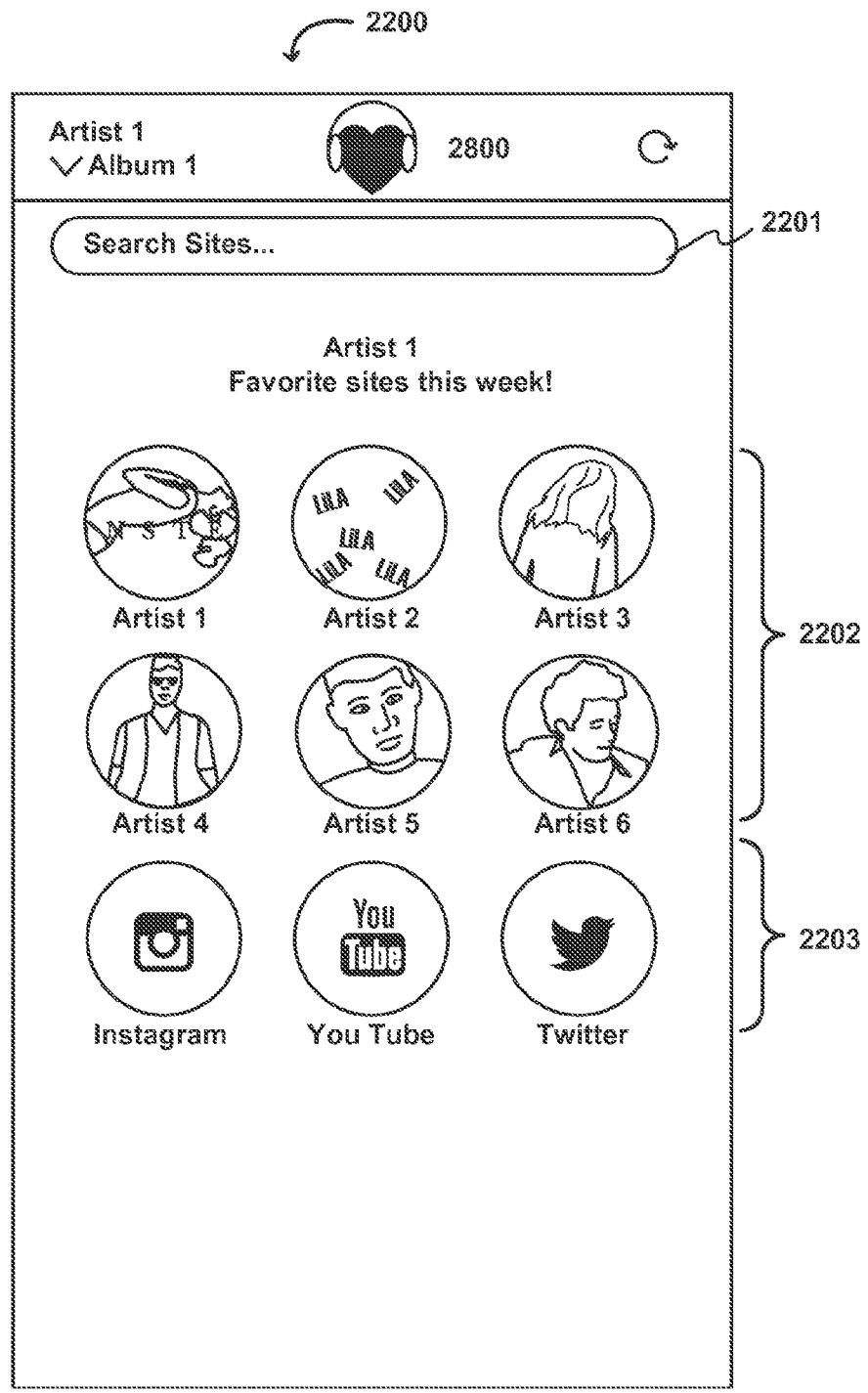
FIG. 22 illustrates a non-limiting example of a screenshot of an interface for displaying targeted advertisements in the artist specific application, according to an implementation of the invention.

FIG. 22 illustrates a non-limiting example of a screenshot of an interface 2200 for displaying non-intrusive targeted advertisements in the ASA, according to an implementation of the invention. Interface 2200 may include a plurality of advertisement icons 2202 presented as favorite sites of the artist. The advertisement icons may include links to downloads of other ASAs. Selecting an icons associated with another ASA may cause the other ASA to be downloaded. Interface 2200 may also include a plurality of icons 2203 for social media that is of interest to the artist. Selecting on an icon may cause the ASA to display the respective social media feed.

In some implementations, interface 2200 may include a search window 801 that receives search input to search for content within the ASA, other ASAs, and/or remote devices (e.g., other user devices 170, computer system 110, etc.).

Computer system 110 and user devices 170 may each include, without limitation, server devices (e.g., server blades), desktop computers, laptop computers, tablet computers, mobile computers (e.g., smartphones), dedicated media player devices, and/or device that may be programmed with the various computer program instructions described herein (e.g., platform management application 120, system instructions 122, ASAs 124, etc.).

Although illustrated in FIG. 1 as a single component, computer system 110 may include a plurality of individual components (e.g., computer devices) each programmed with at least some of the functions described herein. In this manner, some components of computer system 110 may perform some functions while other components may perform other functions, as would be appreciated. The one or more processors 112 may each include one or more physical processors that are programmed by computer program instructions. The various instructions described herein are exemplary only. Other configurations and numbers of instructions may be used, so long as the processor(s) 112 are programmed to perform the functions described herein.

Furthermore, it should be appreciated that although the various instructions are illustrated in FIG. 1 as being co-located within a single processing unit, in implementations in which processor(s) 112, 172 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112, 172 may be programmed by one or more additional instructions that may perform some or all of the functionality attributed herein to one of the instructions.

The various instructions described herein may be stored in a storage device 114, 174 which each may comprise random access memory (RAM), read only memory (ROM), and/or other memory. The storage device may store the computer program instructions (e.g., the aforementioned instructions) to be executed by processor 112, 172 as well as data that may be manipulated by processor 112, 172. The storage device may comprise floppy disks, hard disks, optical disks, tapes, or other storage media for storing computer-executable instructions and/or data.

The various components illustrated in FIG. 1 may be coupled to at least one other component via network 102, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1 and other drawing Figures, different numbers of entities than depicted may be used. Furthermore, according to various implementations, the components described herein may be implemented in hardware and/or software that configure hardware.

The various databases 130 described herein may be, include, or interface to, for example, an Oracle™ relational database sold commercially by Oracle Corporation, MySQL, SYBASE, Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer implemented method for updating a dynamic album that includes a set of songs stored in relation to and played by an artist specific application associated with an artist, the method being implemented on a user device having one or more physical processors programmed with computer program instructions that, when executed by the one or more physical processors, cause the user device to perform the method, the method comprising:
   receiving, by the user device, one or more album parameters that specify a change to be made to the dynamic album that includes a plurality of songs, wherein the dynamic album is stored via information encoding the plurality of songs at the user device in association with the artist specific application that plays the dynamic album at the user device;
   accessing, by the user device, the information encoding the plurality of songs responsive to receipt of the one or more album parameters;
   modifying, by the user device, the information encoding the plurality of songs based on the one or more album parameters to change the dynamic album without intervention by a user of the user device;
   storing, by the user device, the modified information encoding the plurality of songs at the user device; and
   playing, by the user device, at least some of the dynamic album through the artist specific application based on the modified information encoding the plurality of songs at the user device.

2. The method of claim 1, wherein the one or more album parameters originate from the artist associated with the artist specific application to change the dynamic album for users that have installed the artist specific application.

3. The method of claim 1, wherein the information encoding the plurality of songs is integrated with an executable file associated with the artist specific application.

4. The method of claim 1, wherein the one or more album parameters specify a new song to be added to the dynamic album, the method further comprising:
   receiving information that encodes the new song, wherein modifying the information encoding the plurality of songs comprises re-encoding the information encoding the plurality of songs such that the new song is included in the dynamic album.

5. The method of claim 1, wherein the one or more album parameters specify a song to be removed from the dynamic album, the method further comprising:
   omitting the song to be removed during playback of the dynamic album.

6. The method of claim 5, wherein omitting the song to comprises deleting the song.

7. The method of claim 5, wherein omitting the song comprises updating an indicator associated with the song to be removed to indicate that the song should not be played in association with the dynamic album.

8. The method of claim 1, wherein the one or more album parameters specify a song to be replaced with a replacement song, the method further comprising:
   causing the replacement song to be played instead of the song to be replaced during playback of the dynamic album.

9. The method of claim 8, wherein the replacement song comprises a different version of a song to be replaced.

10. The method of claim 1, wherein the one or more album parameters specify a reshuffling of the dynamic album, the method further comprising:
    changing an order in which the plurality of songs of the dynamic album is played based on the one or more album parameters.

11. The method of claim 1, wherein the plurality of songs is playable at the user device through only the artist specific application.

12. The method of claim 1, wherein the dynamic album is subject to a music lease that, when expires, renders the dynamic album unplayable, the method further comprising:
    determining whether the music lease has been expired; and
    rendering the dynamic album unplayable responsive to a determination that the music lease has expired.

13. The method of claim 1, the method further comprising:
    initiating playback of the dynamic album upon initiation of the artist specific application.

14. A system for updating a dynamic album that includes a set of songs stored in relation to and played by an artist specific application associated with an artist, the system comprises:
    a user device comprising one or more physical processors programmed with computer program instructions that, when executed by the one or more physical processors, cause the user device to:
    receive one or more album parameters that specify a change to be made to the dynamic album that includes a plurality of songs, wherein the dynamic album is stored via information encoding the plurality of songs at the user device in association with the artist specific application that plays the dynamic album at the user device;
    access the information encoding the plurality of songs responsive to receipt of the one or more album parameters;
    modify the information encoding the plurality of songs based on the one or more album parameters to change the dynamic album without intervention by a user of the user device;
    store the modified information encoding the plurality of songs at the user device; and
    play at least some of the dynamic album through the artist specific application based on the modified information encoding the plurality of songs at the user device.

15. The system of claim 14, wherein the one or more album parameters originate from the artist associated with the artist specific application to change the dynamic album for users that have installed the artist specific application.

16. The system of claim 14, wherein the information encoding the plurality of songs is integrated with an executable file associated with the artist specific application.

17. The system of claim 14, wherein the one or more album parameters specify a new song to be added to the dynamic album, the user device further programmed to:
- receive information that encodes the new song, wherein modifying the information encoding the plurality of songs comprises re-encoding the information encoding the plurality of songs such that the new song is included in the dynamic album.

18. The system of claim 14, wherein the one or more album parameters specify a song to be removed from the dynamic album, wherein the user device is further programmed to:
- omit the song to be removed during playback of the dynamic album.

19. The system of claim 18, wherein to omit the song, the user device is further programmed to delete the song.

20. The system of claim 18, wherein to omit the song, the user device is further programmed to:
- update an indicator associated with the song to be removed to indicate that the song should not be played in association with the dynamic album.

21. The system of claim 14, wherein the one or more album parameters specify a song to be replaced with a replacement song, the user device further programmed to:
- cause the replacement song to be played instead of the song to be replaced during playback of the dynamic album.

22. The system of claim 20, wherein the replacement song comprises a different version of a song to be replaced.

23. The system of claim 14, wherein the one or more album parameters specify a reshuffling of the dynamic album, wherein the user device is further programmed to:
- change an order in which the plurality of songs of the dynamic album is played based on the one or more album parameters.

24. The system of claim 14, wherein the plurality of songs is playable at the user device through only the artist specific application.

25. The system of claim 14, wherein the dynamic album is subject to a music lease that, when expires, renders the dynamic album unplayable, wherein the user device is further programmed to:
- determine whether the music lease has been expired; and
- render the dynamic album unplayable responsive to a determination that the music lease has expired.

26. The system of claim 14, wherein the user device is further programmed to:
- initiate playback of the dynamic album upon initiation of the artist specific application.

27. A computer implemented method for receiving commands from an artist to update a dynamic album at a user device that includes a set of songs stored in relation to and played by an artist specific application associated with the artist, the method being implemented on a computer system having one or more physical processors programmed with computer program instructions that, when executed by the one or more physical processors, cause the computer system to perform the method, the method comprising:
- receiving, by the computer system, from the artist, one or more commands that specify a change to be made to the dynamic album played at the user device through the artist specific application associated with the artist;
- generating, by the computer system, one or more album parameters used to change the dynamic album based on the one or more commands; and
- providing, by the computer system, the one or more album parameters to at least the user device remote from the computer system at which the artist specific application is installed, wherein the one or more album parameters cause the user device to change the dynamic album in association with the artist specific application without intervention by a user of the user device.

28. The method of claim 27, wherein providing the one or more album parameters to the user device comprises:
- identifying the user device based on identifying information used to identify the user device, wherein the one or more album parameters are provided based on the identification.

29. The method of claim 28, wherein the identifying information comprises a user account identifier that is associated with the user device.

30. The method of claim 27, wherein the one or more album parameters is provided to the user device responsive to a communication received from the first user device.

* * * * *